US012792664B1

(12) United States Patent
Sadr et al.

(10) Patent No.: US 12,792,664 B1
(45) Date of Patent: Nov. 10, 2026

(54) GENERATING HYBRID VIDEO RESPONSES TO SEARCH QUERIES

(71) Applicant: Google LLC, Mountain View, CA (US)

(72) Inventors: Arash Sadr, Belmont, CA (US); Maryam Gholami, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 19/348,369

(22) Filed: Oct. 2, 2025

(51) Int. Cl.
*G06F 16/738* (2019.01)
*G06F 16/735* (2019.01)

(52) U.S. Cl.
CPC .......... *G06F 16/738* (2019.01); *G06F 16/735* (2019.01)

(58) Field of Classification Search
CPC ............................ G06F 16/738; G06F 16/735
USPC .......................................................... 707/722
See application file for complete search history.

(56) References Cited

U.S. PATENT DOCUMENTS

| | | | | |
|---|---|---|---|---|
| 9,672,280 | B2 * | 6/2017 | Liu | G06F 16/73 |
| 2008/0192116 | A1 * | 8/2008 | Tamir | G06T 7/292 348/157 |
| 2009/0292685 | A1 * | 11/2009 | Liu | G06F 16/73 707/999.005 |
| 2024/0232937 | A1 * | 7/2024 | D'Auria | G06N 3/0475 |
| 2024/0305800 | A1 * | 9/2024 | Balko | G11B 27/031 |
| 2026/0065883 | A1 * | 3/2026 | Sangston | G06V 10/764 |
| 2026/0162378 | A1 * | 6/2026 | Taketani | G06T 19/006 |

* cited by examiner

*Primary Examiner* — Kimberly L Wilson
(74) *Attorney, Agent, or Firm* — DORITY & MANNING, P.A.

(57) ABSTRACT

Systems and methods for generating video search results can utilize an agentic generative model and a video generation model to render a hybrid video that is responsive to the search query. The systems and methods can obtain a search query and determine a plurality of responsive search results. A generative agentic model can generate a video generation plan and interface with external tools. Based on the video outline output, the systems and methods can determine a particular video search result from a web source and generate a synthetic video segment using a video generation model. A response video can be generated based on the video outline output, the particular video search result, and the synthetic video segment. The response video can include at least a portion of a pre-existing video and at least a portion of a model-generated video.

20 Claims, 20 Drawing Sheets

100

100

500

800

99

GENERATING HYBRID VIDEO RESPONSES TO SEARCH QUERIES

FIELD

The present disclosure relates generally to hybrid video search result generation. More particularly, the present disclosure relates to generating a hybrid video that includes synthetic model-generated video segments and pre-existing video search result segments to respond to a search query.

BACKGROUND

Understanding complex topics can be difficult. Traditional search systems may output a list of search results with text snippets; however, parsing that information for an answer to a query can be tedious and non-intuitive. Moreover, text response may not provide a medium that is easily understandable for that topic and/or for the user.

In addition, the content being requested by the user may not be readily available to the user based on the user not knowing where to search, based on the storage location of the content, and/or based on the content not existing. The user may be requesting search results based on an imagined concept without a clear way to express the imagined concept.

SUMMARY

Aspects and advantages of embodiments of the present disclosure will be set forth in part in the following description, or can be learned from the description, or can be learned through practice of the embodiments.

One example aspect of the present disclosure is directed to a computing system for video search result generation. The system can include one or more processors and one or more non-transitory computer-readable media that collectively store instructions that, when executed by the one or more processors, cause the computing system to perform operations. The operations can include obtaining a search query entered into a search interface. The search query can be associated with a request for information on a subject. The operations can include determining a plurality of search results based on the search query. The plurality of search results can be determined to be responsive to the search query. The operations can include processing the search query and at least a subset of the plurality of search results with a generative agentic model to generate a video outline output. In some implementations, the generative agentic model may be configured to generate the video outline output descriptive of a set of tasks for video generation and including an interface task for interfacing with an external tool to perform at least a subset of the set of tasks. The operations can include determining a particular video search result based on the video outline output. The particular video search result can be associated with the subject and obtained from a web source. The operations can include generating a synthetic video segment with a video generation model based on processing at least a portion of the video outline output generated with the generative agentic model. The operations can include generating a response video based on the video outline output, the particular video search result, and the synthetic video segment. In some implementations, the response video can include at least a portion of the particular video search result and at least a portion of the synthetic video segment. The operations can include providing the response video for display within the search interface.

In some implementations, generating the response video based on the video outline output, the particular video search result, and the synthetic video segment can include stitching together at least one or more portions of the particular video search result with at least one or more portions of the synthetic video segment based on the video outline output to generate a stitched video. The at least one or more portions of the particular video search result can be stitched together with the at least one or more portions of the synthetic video segment by the generative agentic model. The generative agentic model can interface with a search engine to determine and obtain the particular video search results. The generative agentic model can interface with the video generation model to generate and obtain the synthetic video segment. The generative agentic model can process the video outline output, the particular video search result, and the synthetic video segment to generate the response video. Generating the response video based on the video outline output, the particular video search result, and the synthetic video segment can include processing the stitched video with the generative agentic model to generate a narration script for the stitched video, processing the narration script with an audio generation model to generate a model-generated audio output, and generating the response video based on combining visuals of the stitched video with the model-generated audio output.

In some implementations, generating the response video based on the video outline output, the particular video search result, and the synthetic video segment can include parsing the particular video search result into a plurality of pre-existing video segments and concatenating at least a subset of the plurality of pre-existing video segments with the synthetic video segment. The video outline output can include an outline indicating a plurality of content items from the plurality of search results to utilize in video generation. The outline can include a synthetic video generation prompt to transmit to the video generation model. The outline can include a pre-existing video obtainment request. In some implementations, the plurality of content items can include text content items and image content items. Generating the response video based on the video outline output, the particular video search result, and the synthetic video segment can include generating an audio file based on the text content items; generating a sequence of visuals based on the image content items, the particular video search result, and the synthetic video segment; and generating the response video based on the audio file and the sequence of visuals.

In some implementations, the video generation model comprises a video diffusion model.

Another example aspect of the present disclosure is directed to a computer-implemented method for hybrid video generation. The method can include obtaining, by a computing system including one or more processors, a search query entered into a user interface. The search query can be associated with a request for information on a subject. The method can include determining, by the computing system, a plurality of search results based on the search query. The plurality of search results can be determined to be responsive to the search query. The method can include processing, by the computing system, the search query and at least a subset of the plurality of search results with a generative agentic model to generate a video outline output. The generative agentic model may be configured to generate the video outline output descriptive of a set of tasks for video generation and including an interface task for interfacing with an external tool to perform at least a subset of the set of tasks. The method can include determining, by the computing system, a plurality of particular video search results based on the video outline output. The plurality of particular video search results can be associated with the subject and obtained from a plurality of web sources. The method can include generating, by the computing system, a plurality of synthetic video segments with a video generation model based on processing at least a portion of the video outline output generated with the generative agentic model. The method can include generating, by the computing system, a response video based on the video outline output, the plurality of particular video search results, and the plurality of synthetic video segments. The response video can include a plurality of pre-existing video segments from the plurality of particular video search results and a plurality of model-generated video segments from the plurality of synthetic video segments. The method can include providing, by the computing system, the response video for display within the user interface.

In some implementations, the method can include generating a plurality of source tags based on the plurality of particular video search results utilized to generate the response video. The plurality of source tags can be associated with the plurality of sources of the plurality of particular video search results. The method can include processing the response video to generate a plurality of source tag anchors descriptive of times within the response video in which respective video segments of the plurality of particular video search results are displayed and associating the plurality of source tags with the plurality of source tag anchors. Providing, by the computing system, the response video for display within the user interface can include, during video playback, providing a respective source tag of the plurality of source tags for display when a respective source tag anchor of the plurality of source tag anchors is reached. The plurality of source tags can include a plurality of selectable user interface elements that are selectable to navigate to a respective source of the plurality of sources of the plurality of particular video search results.

In some implementations, the video outline output can include content item snippets from the plurality of search results, model-generated text segments, content item identifiers associated with videos from the plurality of search results, a video segment generation prompt, and a plurality of tool calls for interfacing with a plurality of external tools. The response video can include the plurality of model-generated video segments as transitions for providing additional details associated with content provided by the plurality of pre-existing video segments.

Another example aspect of the present disclosure is directed to one or more non-transitory computer-readable media that collectively store instructions that, when executed by one or more computing devices, cause the one or more computing devices to perform operations. The operations can include obtaining a search query. The search query can be associated with a request for information on a subject. The operations can include determining a plurality of search results based on the search query. The plurality of search results can be determined to be responsive to the search query. In some implementations, the plurality of search results can include a plurality of video search results. The operations can include processing the search query and at least a subset of the plurality of search results with a generative agentic model to generate a video segment generation prompt and a model call. The generative agentic model may be configured to generate the video outline output descriptive of a set of tasks for video generation and including an interface task for interfacing with an external tool to perform at least a subset of the set of tasks. The operations can include determining, with the generative agentic model, a set of video search results of the plurality of video search results to utilize for response video generation. The set of video search results can be associated with the subject and obtained from a web source. The operations can include generating, based on the model call, a synthetic video segment with a video generation model based on processing the video segment generation prompt generated with the generative agentic model. The operations can include generating a response video based on the set of video search results and the synthetic video segment. In some implementations, the response video can include at least a portion of the set of video search results and at least a portion of the synthetic video segment. The operations can include providing the response video as output.

In some implementations, the operations can include obtaining web data, processing the web data to determine a trending topic, and generating the search query based on the trending topic. The operations can include storing the search query and the response video in an index database. In some implementations, the operations can include obtaining a user query with a search interface, determining the user query is associated with the subject of the search query, and in response to determining the user query is associated with the subject of the search query, providing the response video for display with the search interface.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
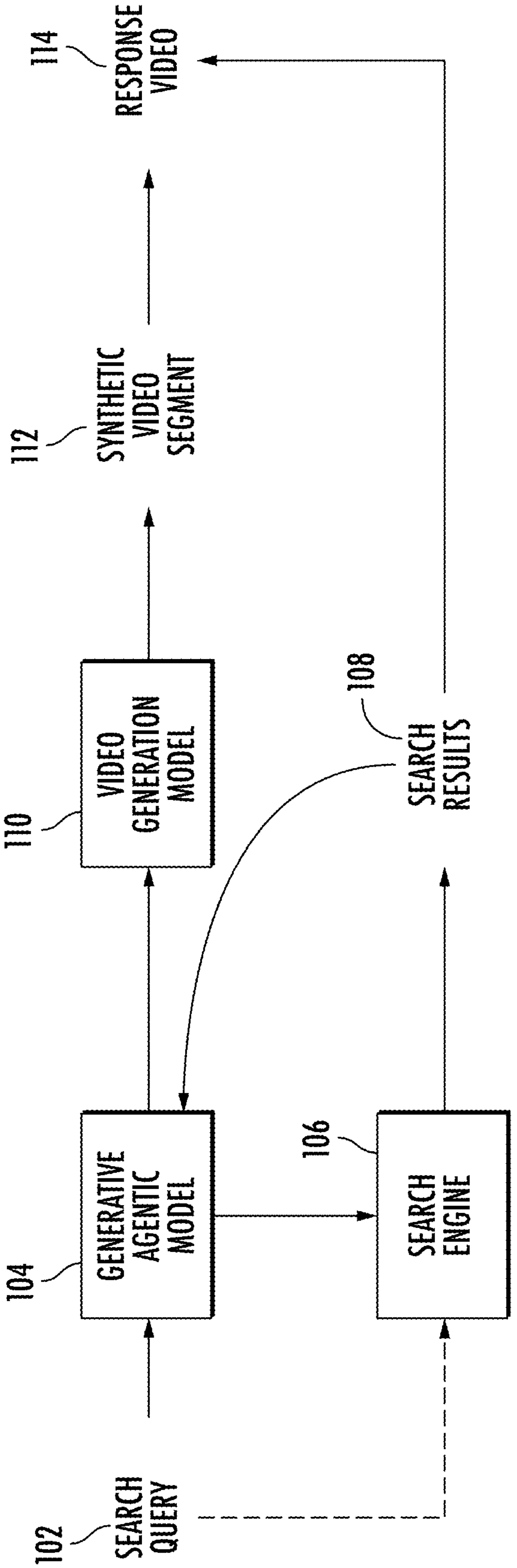
FIG. 1 depicts a block diagram of an example response video generation system according to example embodiments of the present disclosure.

Reference numerals that are repeated across plural figures are intended to identify the same features in various implementations.

DETAILED DESCRIPTION

Generally, the present disclosure is directed to systems and methods for generating a hybrid video search result. In particular, the systems and methods disclosed herein can leverage a plurality of generative models including an agentic planning model and a video generation model to generate a hybrid video of synthetic and pre-existing video segments that can be utilized to respond to a search query. For example, the systems and methods can include obtaining a search query. The search query can be processed with a generative agentic model to generate a hybrid video generation plan, which may include a video outline output. The video generation plan can include synthetic video generation prompts (e.g., prompts to be processed with a video generation model to generate synthetic video segments to include in the hybrid video), video search result indicators (e.g., indicating particular video search result segments to utilize in the hybrid video generation), and/or external tool calls for interfacing with one or more external tools. The video generation plan may be generated based on performing an initial search and providing at least a subset of the search results to the generative agentic model. Based on the video generation plan, a set of video search results can be obtained, and the synthetic video generation prompts can be transmitted to and processed with a video generation model to generate one or more synthetic video segments (e.g., model-generated video segments). The set of video search results and the one or more synthetic video segments can then be utilized to generate a response video that includes pre-existing video segments and synthetic video segments. The response video can then be provided as a response to the search query Video generation with hybrid content can provide for the generation of model-generated overview outputs and/or other content that may be provided in a search results page and/or a chat interface. The model-generated video can combine search result content with model-generated content, which can provide distilled, detailed information in a digestible medium.

Traditional search results can fail to directly respond to a user query and/or may rely on the user to perform tedious navigation actions before an answer is obtained. Moreover, model-generated text may not provide a desired medium for transferring information.

The systems and methods disclosed herein can be directed to generating a model-generated search results video that includes pre-existing content (e.g., real world videos and images) and generative AI generated video segments that are combined to generate a hybrid video. The systems and methods can perform an initial search, generate a video script based on the search results, obtain search result video segments, and generate the model-generated video by stitching the video segments and generating synthetic video data based on the script.

The systems and methods disclosed herein can be less computationally expensive when compared to from-scratch video generation and can provide for pre-existing content leveraging. The systems and methods can be utilized to respond to immersive queries and/or prompts.

The response video generation system may be implemented into a search interface, an autonomous generative chat interface, and/or a proactive content suggestion interface that may proactively generate search queries based on determined trends that can then be utilized to proactively generate and display a hybrid video covering a trending topic. The video response disclosed herein may provide for a search results format that can distill information into a digestible format.

The field of information retrieval can relate to systems and methods for responding to search queries. Search engines can provide a list of links to web pages, images, videos, and/or other resources that are determined to be relevant to a user's query. The user can then select from these results to navigate to the source content and find the information they are seeking. The process may involve reviewing multiple search results and synthesizing information from various sources to fully address the initial query.

In some instances, to provide a more direct answer, search engines with the aid of artificial intelligence models (e.g., large language models (LLMs)) may generate a textual summary based on information aggregated from multiple responsive search results. These text-based summaries can provide a concise response to a query, but they may be limited to a single modality. While text is a useful medium for conveying information, text alone may not be suitable for all types of queries and/or for all users, particularly for complex topics where visual demonstrations or dynamic explanations could be more illustrative.

Video generation models can produce synthetic video content from a text prompt. These models can create entirely new video sequences from scratch, including visuals and audio, based on the provided input. However, generating high-quality, factually accurate, and contextually relevant video content purely through synthesis can be computationally intensive. Furthermore, outputs from such models can sometimes contain visual artifacts or factual inaccuracies, known as hallucinations, as the generated content is not grounded in pre-existing, verifiable sources.

Another approach to addressing user queries can include retrieving pre-existing videos from web sources that are relevant to a search query. For example, a search engine can return links to full-length videos hosted on various platforms. Some systems may also identify and present specific segments of a longer video that are deemed most relevant to the query. This approach may rely on the availability and quality of existing video content. A single pre-existing video, or even a segment thereof, may not comprehensively address all aspects of a complex query, and may contain extraneous information not relevant to the user's specific informational need.

Computing systems, computer-implemented methods, and non-transitory computer-readable media for generating a response video to a search query can leverage one or more generative models for video generation. The response video can include a hybrid composition, integrating segments from pre-existing videos obtained from web sources with synthetically generated video segments created by a video generation model.

In one aspect, a computing system can obtain a search query and determine a plurality of responsive search results. A generative agentic model, which is configured to generate a semantic plan for video generation and to interface with external tools, can process the search query and at least a subset of the search results to generate a video outline output. The video outline output can guide the subsequent generation of the response video. Based on the outline, the system can determine and obtain at least one particular video search result from a web source and generate at least one synthetic video segment using a video generation model. The system can then generate a response video that combines at least a portion of the pre-existing video from the particular video search result with at least a portion of the model-generated synthetic video segment. The final response video can then be provided for display, for instance, within a search interface.

In another aspect, a computer-implemented method for hybrid video generation can involve similar steps. After obtaining a search query and determining responsive search results, a generative agentic model can be utilized to generate a video outline output. Based on the outline, the system can identify and obtain a plurality of particular video search results and may generate a plurality of synthetic video segments using a video generation model. A response video can then be generated by combining pre-existing video segments from the identified search results with the newly generated synthetic video segments. The response video can then be provided for display within a user interface. The approach can provide a technical solution for creating comprehensive, multimedia responses to user queries by leveraging existing, verifiable video content while using model-generated content to fill informational gaps, provide transitions, and/or enhance explanations.

In some implementations, one or more non-transitory computer-readable media can store instructions that, when executed, cause a computing device to perform these operations. The operations can include obtaining a search query, determining responsive search results, and using a generative agentic model to generate a plan for a video response. The plan may include generating a video segment generation prompt and a model call. The generative agentic model may determine a set of pre-existing video search results to use. A synthetic video segment can be generated with a video generation model based on the prompt, and a response video can be generated that incorporates both the selected pre-existing video content and the synthetic video segment. The resulting response video can be provided as output. In some implementations, the system may proactively generate and store such response videos based on trending topics, making them readily available for subsequent user queries related to the same subject.

The systems and methods of the present disclosure provide a number of technical effects and benefits, particularly in relation to improved computational efficiency in video generation. Generating video content entirely from scratch using generative models can be a computationally intensive process, consuming significant processing power, memory, and time, which can lead to high latency. By contrast, the disclosed systems can leverage a hybrid approach that integrates segments of pre-existing, web-sourced videos with targeted, synthetically generated video segments interweaved. The approach can reduce the overall computational load on the video generation model because the model is no longer tasked with generating the entire video sequence. Instead, the video generation model may only be invoked to generate specific portions of the video, such as transitions or explanatory visuals, where suitable pre-existing content is unavailable. The targeted generation can significantly reduce the number of processing cycles and the amount of data that needs to be generated, which in turn lowers the overall computational cost and reduces the latency in producing the final response video.

Another technical benefit relates to the improved functioning of the computing system by optimizing resource allocation and reducing response times for complex queries. The use of a generative agentic model to generate a video outline output provides a structured, efficient plan for assembling the response video. The generative agentic model can intelligently identify and select relevant segments from existing video search results, thereby offloading a substantial portion of the content creation task to retrieval and editing operations, which are computationally less expensive than generative processes. By relying on pre-existing video assets for at least part of the content, the system can minimize the reliance on resource-heavy generative models, while ensuring real world information grounding. The selective use of generation only for "gap-filling" or enhancement purposes allows the computing system to produce a comprehensive, high-quality video response more quickly and with fewer computational resources than a purely generative approach. The efficiency gain can lead to a direct technical improvement in system performance, enabling faster delivery of video-based search results, while providing tailored, novel, and direct responses to search queries.

With reference now to the Figures, example embodiments of the present disclosure will be discussed in further detail.

FIG. 1 depicts a block diagram of an example response video generation system 100 according to example embodiments of the present disclosure. In some implementations, the response video generation system 100 is configured to receive, and/or obtain, a search query 102 descriptive of a request for information on a subject and, as a result of receipt of the search query 102, generate, determine, and/or provide a response video 114 that is responsive to the search query 102 and includes both pre-existing and model-generated video segments. Thus, in some implementations, the response video generation system 100 can include a generative agentic model 104 that is operable to generate a video generation plan that can then be performed in order to generate a hybrid video responsive to the search query 102.

In particular, the response video generation system 100 can obtain a search query 102. The search query 102 can be descriptive of a request for information on a topic. The search query 102 can include text data, image data, audio data, latent encoding data, video data, multimodal data, and/or other data. In some implementations, the search query 102 can be obtained via a search input box and/or a chat input box.

A generative agentic model 104 can process the search query 102 to generate a video generation plan that includes a video outline output. The video outline output can include a set of model calls, video generation prompts, and content item calls for generating a response video 114. In some implementations, the generative agentic model 104 can process the search query 102, determine a search is to be performed, interface with a search engine 106 to determine a plurality of search results 108 responsive to the search query 102 and/or a model-generated query, and generate the video generation plan based on the plurality of search results 108. Alternatively and/or additionally, the search engine 106 may process the search query 102 to determine a plurality of search results 108, the plurality of search results 108 can be transmitted to the generative agentic model 104, and the generative agentic model 104 can generate the video generation plan based on the plurality of search results 108.

Based on the video generation plan (e.g., based on the video outline output), the generative agentic model 104 can interface with a video generation model 110 to generate one or more synthetic video segments 112. The one or more synthetic video segments 112 can be generated based on one or more entries in the video outline output. The video generation model 110 can include one or more diffusion models. The one or more synthetic video segments 112 can include model-generated video segments that differ from pre-existing video segments.

The generative agentic model 104 can interface with the search engine 106 and/or parse the plurality of search results 108 to determine one or more video search results to utilize for hybrid video generation based on the video generation plan (e.g., one or more entries of the video outline output can include a content item call for the one or more video search results).

The response video generation system 100 can process the video generation plan, the one or more synthetic video segments 112, and the one or more video search results to generate the response video 114. The response video 114 may be generated with the generative agentic model 104 and/or one or more other machine-learned models. The response video 114 can be responsive to the search query 102 and may be provided for display in a search results interface and/or a chat interface. The response video 114 may include a hybrid video that includes segments of model-generated videos and segments of pre-existing videos.

Figure 2:
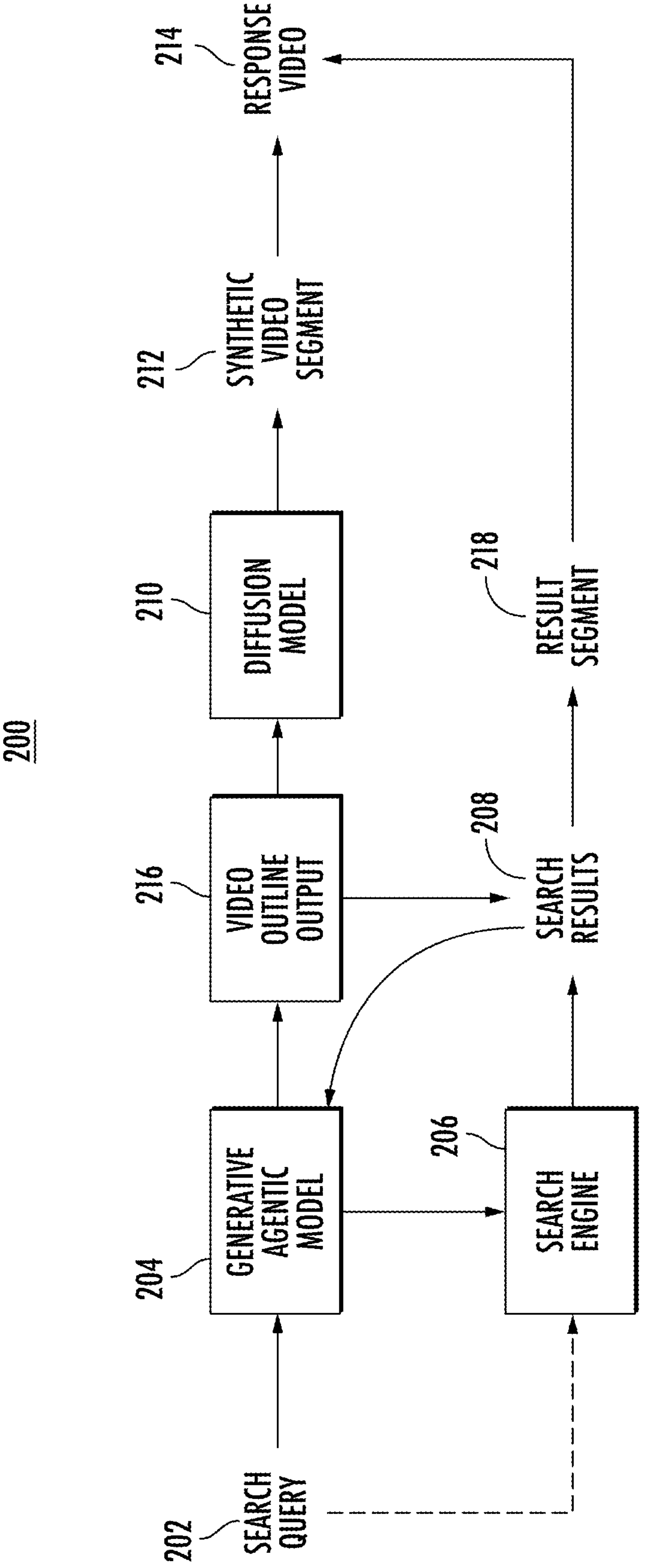
FIG. 2 depicts a block diagram of an example query response system according to example embodiments of the present disclosure.

FIG. 2 depicts a block diagram of an example query response system 200 according to example embodiments of the present disclosure. The query response system 200 is similar to response video generation system 100 of FIG. 1 except that query response system 200 further includes video search result segmentation.

In particular, the query response system 200 can obtain a search query 202. The search query 202 can be descriptive of a request for information on a topic (e.g., information on a trending topic, information for performing a do-it-yourself project, information on a scholarly topic, etc.). The search query 202 can include a text string, an image, a video, an audio file, an embedding, metadata, a multimodal input, and/or other input. In some implementations, the search query 202 can be obtained via a search input box and/or a chat input box.

A generative agentic model 204 (e.g., a specifically configured and/or fine-tuned sequence-to-sequence foundation model) can process the search query 202 to generate a video generation plan that includes a video outline output 216 (e.g., a representation that includes an organization of details on set of tasks for generating a hybrid video responsive to the search query 202). The video outline output 216 can include a set of tool calls (e.g., a model call to a diffusion model 210, an engine call to the search engine 206, and/or other tool call), video generation prompts (e.g., one or more prompts to be processed with one or more media content item generation models (e.g., a diffusion model 210)), and content item calls for generating a response video 214. In some implementations, the generative agentic model 204 can process the search query 202, determine a search is to be performed, interface with a search engine 206 (e.g., based on and/or with a tool call) to determine a plurality of search results 208 responsive to the search query 202 and/or a model-generated query, and generate the video generation plan based on the plurality of search results 208. Alternatively and/or additionally, the search engine 206 may process the search query 202 to determine a plurality of search results 208, the plurality of search results 208 can be transmitted to the generative agentic model 204, and the generative agentic model 204 can generate the video generation plan based on the plurality of search results 208.

Based on the video generation plan (e.g., based on the video outline output 216), the generative agentic model 204 can interface with a diffusion model 210 to generate one or more synthetic video segments 212. The one or more synthetic video segments 212 can be generated based on one or more entries in the video outline output 216 (e.g., one or more entries of the video outline output 216 may include one or more video generation prompts). The one or more synthetic video segments 212 can include model-generated video segments that differ from pre-existing video segments.

The generative agentic model 204 can interface with the search engine 206 and/or parse the plurality of search results 208 to determine one or more video search results to utilize for hybrid video generation based on the video generation plan (e.g., one or more entries of the video outline output can include a content item call for the one or more video search results). In some implementations, the one or more video search results can be processed and segmented to generate one or more result segments 218 determined to be responsive to one or more entries of the video outline output. The one or more result segments can include video segments determined to be responsive to the search query 202 and determined to be complementary to other generated and/or identified segments.

The query response system 200 can process the video generation plan, the one or more synthetic video segments 212, and the one or more result segments 218 to generate the response video 214. The response video 214 may be generated with the generative agentic model 204 and/or one or more other machine-learned models. The response video 214 can be responsive to the search query 202 and may be provided for display in a search results interface and/or a chat interface. The response video 214 may include a hybrid video that includes segments of model-generated videos and segments of pre-existing videos.

In some implementations, the response video 214 may include audio generated with an audio generation model (e.g., a text-to-speech model that processes a model-generated script that may be generated with the generative agentic model 204). The audio may be generated based on generating the visuals for the hybrid video then processing the search query 202, the video outline output 216, and the visuals for the hybrid video to generate a model-generated script. The model-generated script can then be processed to generate an audio file that may then be aligned with the visuals to generate the response video 214.

Figure 3:
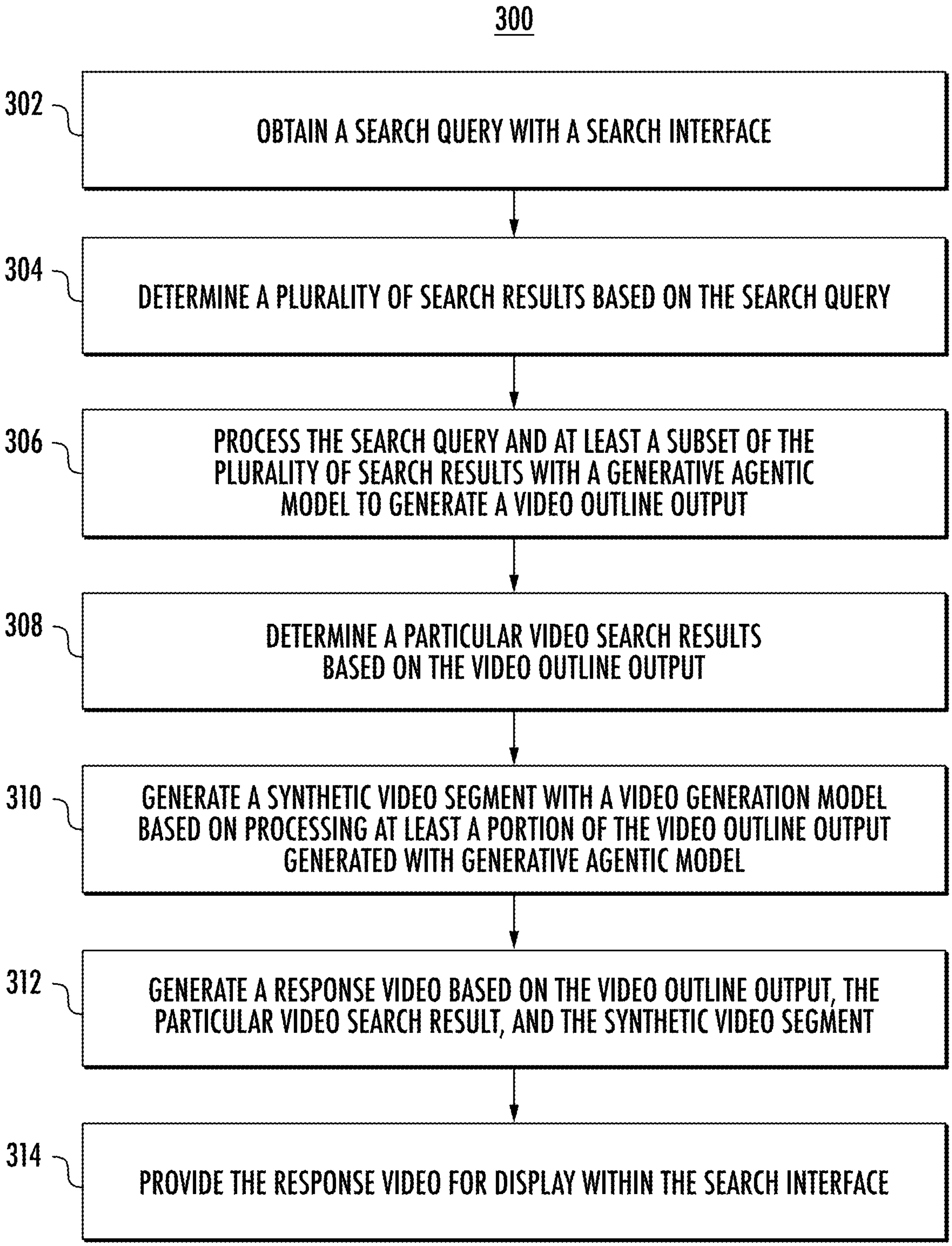
FIG. 3 depicts a flow chart diagram of an example method to perform response video generation according to example embodiments of the present disclosure.

FIG. 3 depicts a flow chart diagram of an example method to perform according to example embodiments of the present disclosure. Although FIG. 3 depicts steps performed in a particular order for purposes of illustration and discussion, the methods of the present disclosure are not limited to the particularly illustrated order or arrangement. The various steps of the method 300 can be omitted, rearranged, combined, and/or adapted in various ways without deviating from the scope of the present disclosure.

At 302, a computing system can obtain a search query with a search interface. The search query can be associated with a request for information on a subject. The subject can include a particular topic, which may include a particular object, place, person, and/or other topic. The search query may include text data, image data, audio data, video data, latent encoding data, multimodal data, and/or other data.

At 304, the computing system can determine a plurality of search results based on the search query. The plurality of search results can be determined to be responsive to the search query. The plurality of search results may be determined by a search engine. In some implementations, the plurality of search results may be determined based on an embedding-based search and/or a sequence-to-sequence prediction model inference.

In some implementations, the search query and/or at least a portion of the search results may be processed with a classification model to determine whether a response video is to be generated. The classification model may be trained to identify search queries associated with a topic deep dive and/or a request requiring a detailed response. The classification model may be trained to identify complex queries (e.g., long-tail queries).

At 306, the computing system can process the search query and at least a subset of the plurality of search results with a generative agentic model to generate a video outline output. The generative agentic model may have been tuned to generate a semantic plan for video generation and interface with an external tool to perform the semantic plan. The generative agentic model may be configured to generate the video outline output. The video outline output can be descriptive of a set of tasks for video generation. The video outline output may include an interface task for interfacing with an external tool to perform at least a subset of the set of tasks. In some implementations, the video generation model can include a video diffusion model. The video outline output can include an outline indicating a plurality of content items from the plurality of search results to utilize in video generation. The outline can include a synthetic video generation prompt to transmit to the video generation model. In some implementations, the outline can include a pre-existing video obtainment request. The plurality of content items can include text content items and image content items. The video outline output may include a latent encoding that can be transmitted to external tools and/or may be re-processed after retrieving the outputs of one or more external tools.

At 308, the computing system can determine a particular video search result based on the video outline output. The particular video search result can be associated with the subject and obtained from a web source. The particular video search result can be one of the plurality of search results. Alternatively and/or additionally, the particular video search result may be determined based on generating a model-generated search query with the generative agentic model and then performing a search based on the model-generated search query.

At 310, the computing system can generate a synthetic video segment with a video generation model based on processing at least a portion of the video outline output generated with the generative agentic model. The video generation model may include a video diffusion model. In some implementations, the video generation model may include a text-to-image diffusion model and a text-to-audio generation model that performs the synthetic video segment based on at least a portion of the video outline output. The synthetic video segments may be generated to fill gaps between pre-existing video segments (e.g., portions of video search results).

At 312, the computing system can generate a response video based on the video outline output, the particular video search result, and the synthetic video segment. The response video can include at least a portion of a pre-existing video and at least a portion of a model-generated video. The response video may be generated with the generative agentic model and/or one or more other machine-learned models. The response video may be generated based on reprocessing the video outline output with the generative agentic model and performing video stitching and audio alignment based on the video outline output and/or a secondary model output. In some implementations, the response video can include at least a portion of the particular video search result and at least a portion of the synthetic video segment.

In some implementations, generating the response video based on the video outline output, the particular video search result, and the synthetic video segment can include stitching together at least one or more portions of the particular video search result with at least one or more portions of the synthetic video segment based on the video outline output to generate a stitched video. The at least one or more portions of the particular video search result can be stitched together with the at least one or more portions of the synthetic video segment by the generative agentic model. In some implementations, the generative agentic model can interface with a search engine to determine and obtain the particular video search results. The generative agentic model can interface with the video generation model to generate and obtain the synthetic video segment. The generative agentic model can process the video outline output, the particular video search result, and the synthetic video segment to generate the response video.

In some implementations, generating the response video based on the video outline output, the particular video search result, and the synthetic video segment further can include processing the stitched video with the generative agentic model to generate a narration script for the stitched video, processing the narration script with an audio generation model to generate a model-generated audio output, and generating the response video based on combining visuals of the stitched video with the model-generated audio output.

In some implementations, generating the response video based on the video outline output, the particular video search result, and the synthetic video segment can include parsing the particular video search result into a plurality of pre-existing video segments and concatenating at least a subset of the plurality of pre-existing video segments with the synthetic video segment.

Additionally and/or alternatively, generating the response video based on the video outline output, the particular video search result, and the synthetic video segment can include generating an audio file based on the text content items; generating a sequence of visuals based on the image content items, the particular video search result, and the synthetic video segment; and generating the response video based on the audio file and the sequence of visuals.

At 314, the computing system can provide the response video for display within the search interface. The search interface may provide the response video for display along with at least a subset of the plurality of search results. The response video may be provided for display along with source attributions for generating the response video and/or linking to portions of the response video.

In some implementations, the segments of the response video that includes video search result segments may be provided with an attribution, which may include a link that can be selected to navigate to the source video. Additionally and/or alternatively, grounding links and/or snippets may be provided with the response video to provide grounding sources for providing the origin or validation of details of the response video.

In some implementations, the response video may include transitions, filters, text, augmentations, aesthetic, and/or other features generated with the video generation model, the generative agentic model, and/or other machine-learned models.

Figure 4:
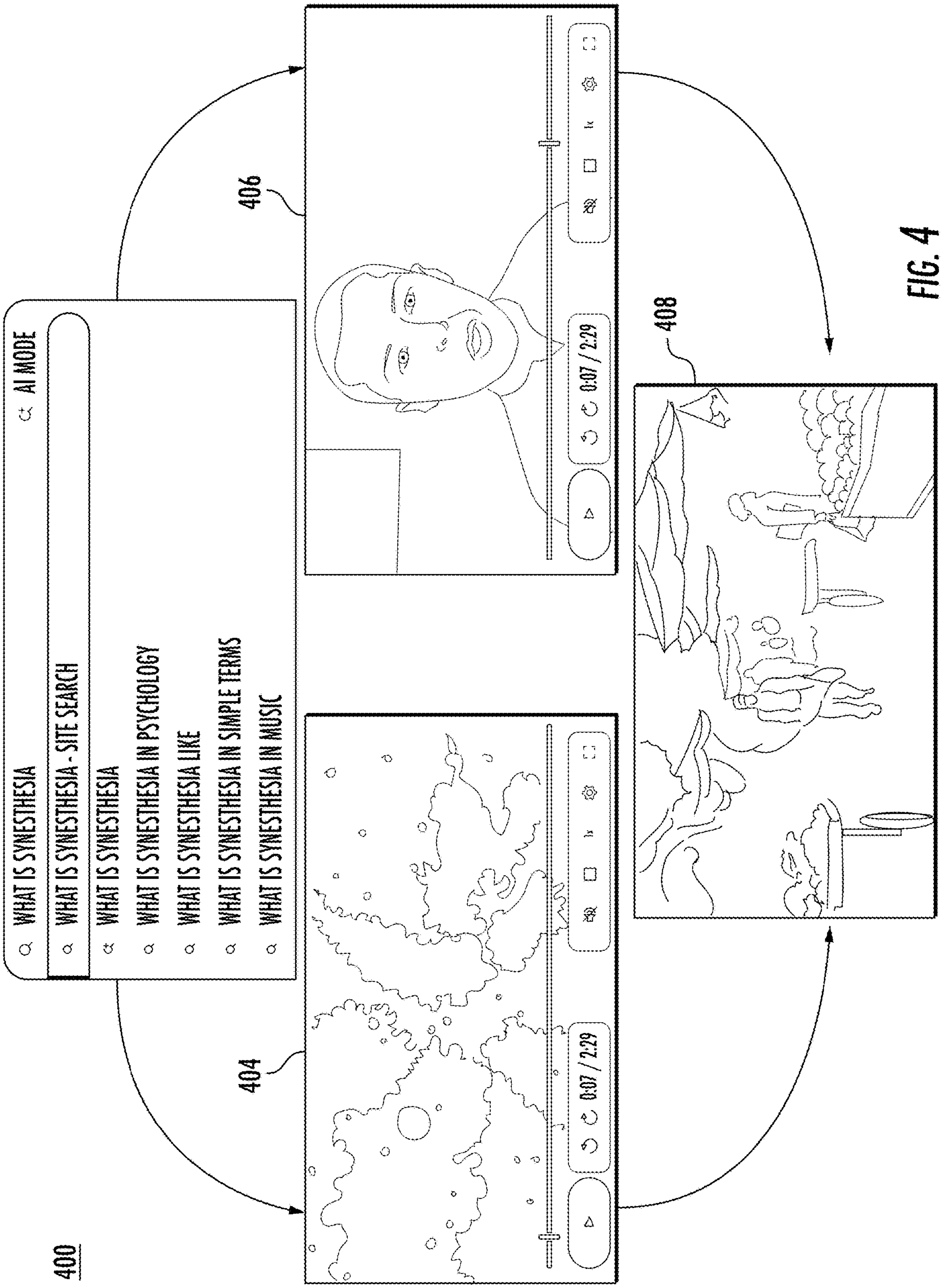
FIG. 4 depicts an illustration of an example video generation flow according to example embodiments of the present disclosure.

FIG. 4 depicts an illustration of an example video generation flow 400 according to example embodiments of the present disclosure. In particular, FIG. 4 can depict an example search query input 402, an example synthetic video segment 404, a video search result segment 406, and a response video 408. For example, the systems and methods disclosed herein can receive a search input 402. The search input 402 can be processed to generate a video generation plan. Based on the video generation plan, a synthetic video segment 404 can be generated, and a video search result segment 406 can be determined and obtained. The synthetic video segment 404 and the video search result segment 406 can then be leveraged to generate the response video 408.

Figure 5:
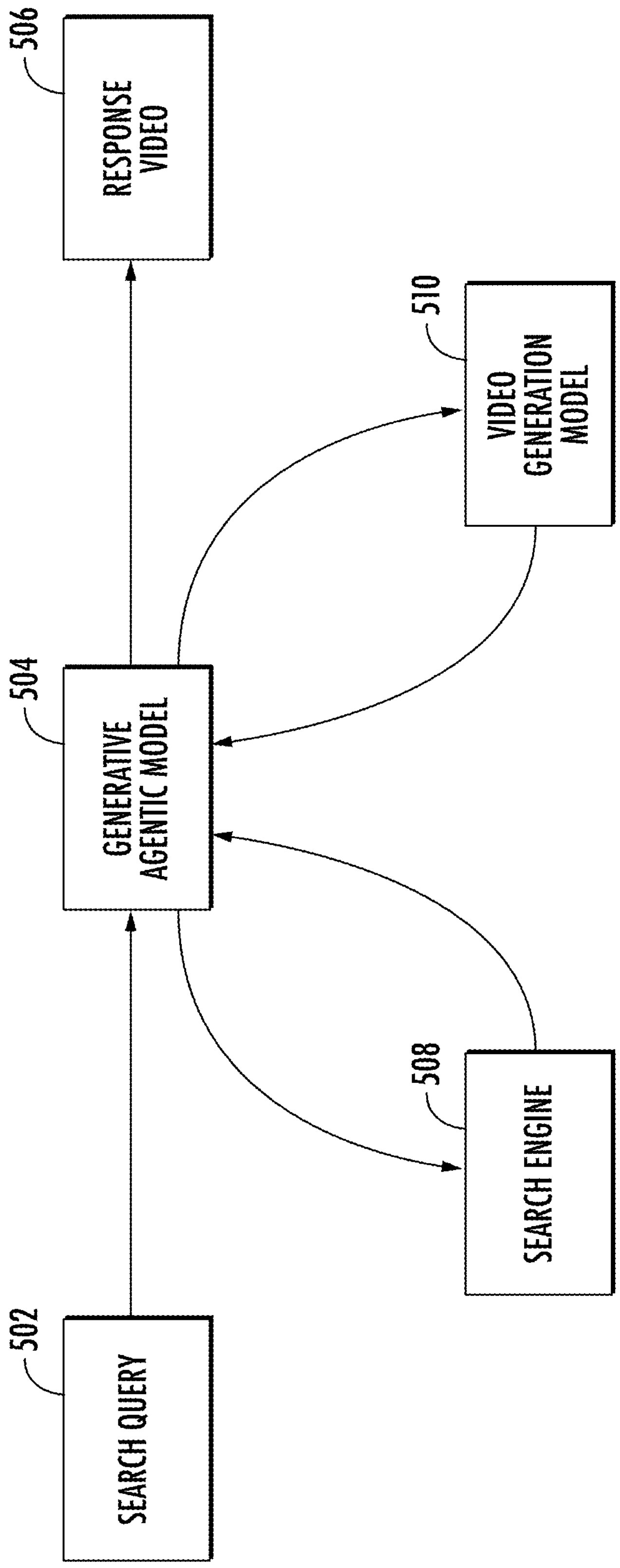
FIG. 5 depicts a block diagram of an example generative agentic model system according to example embodiments of the present disclosure.

FIG. 5 depicts a block diagram of an example generative agentic model system 500 according to example embodiments of the present disclosure. In particular, the generative agentic model 504 can be configured, trained, and/or fine-tuned to process a search query 502 (and/or other prompt) and generate a response video 506 based on iteratively interfacing with a search engine 508, a video generation model 510, and/or one or more other external tools. For example, the generative agentic model 504 can iteratively process an input, generate tool calls, receive outputs of the external tools based on interfacing with the tools based on the tool calls, generate next task predictions, and perform additional inferences until enough information is obtained to generate the response video 506.

Figure 6:
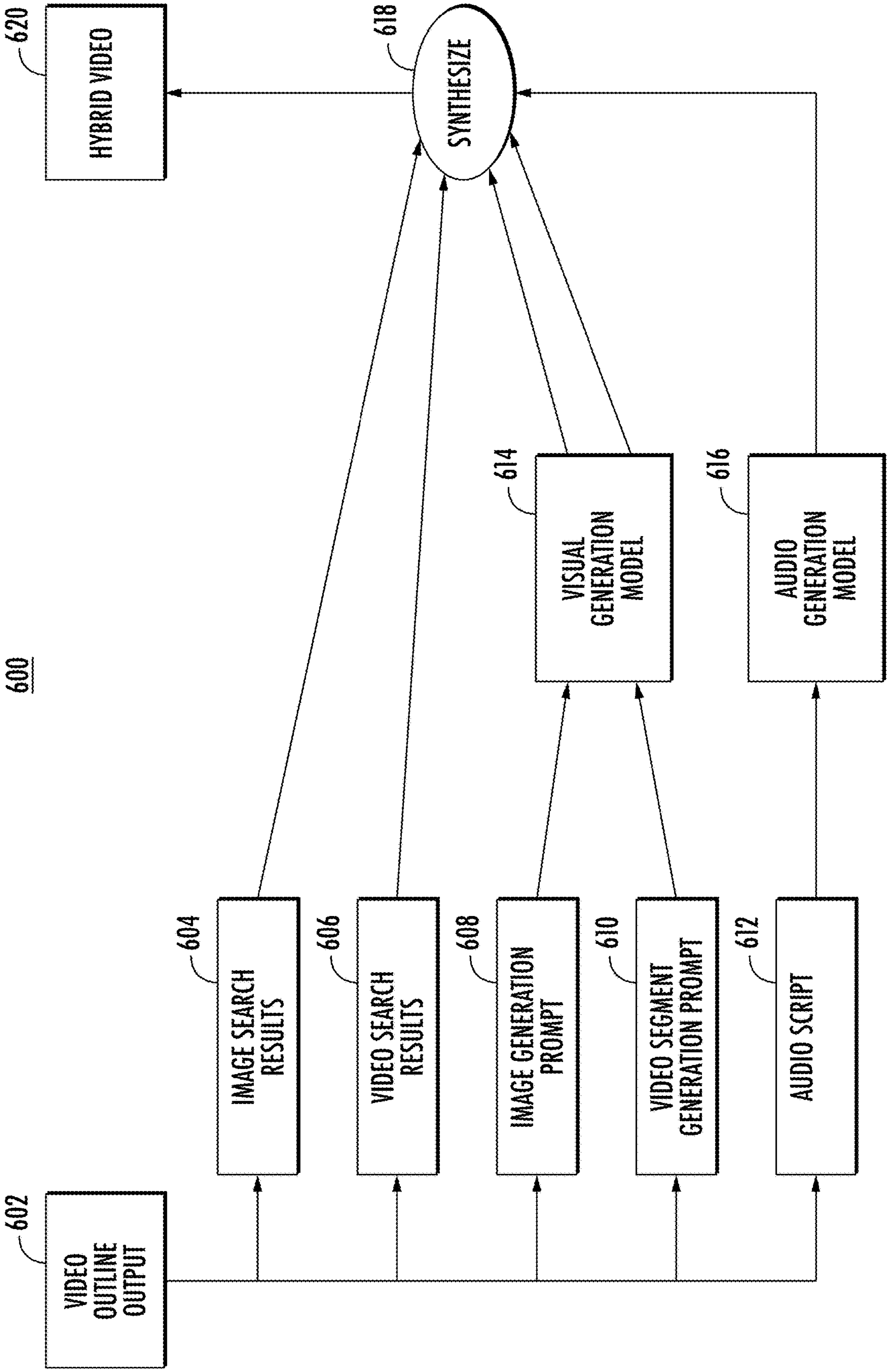
FIG. 6 depicts a block diagram of an example synthesization system according to example embodiments of the present disclosure.

FIG. 6 depicts a block diagram of an example synthesization system 600 according to example embodiments of the present disclosure. In particular, the synthesization system 600 can include obtaining, determining, and/or generating a plurality of content items based on a video outline output 602 that can then be synthesized 618 to generate the hybrid video 620. For example, the video outline output 602 can identify and/or be utilized to identify image search results 604, video search results 606, and/or other search result segments to include in the hybrid video. The video outline output 602 can include one or more image generation prompts 608, one or more video segment generation prompts 610, and/or one or more other content generation prompts. The one or more image generation prompts 608, the one or more video segment generation prompts 610, and/or the one or more other content generation prompts can be processed with one or more content generation models (e.g., one or more visual generation models 614) to generate one or more model-generated media content items. Additionally and/or alternatively, an audio script 612 may be included in the video outline output 602 and/or may be generated based on the video outline output 602. The audio script 612 can be processed with an audio generation model 616 (e.g., a text-to-speech model) to generate an audio file. The search results, model-generated content items, and/or the audio file can then be processed to synthesize 618 a hybrid video 620.

Figure 7:
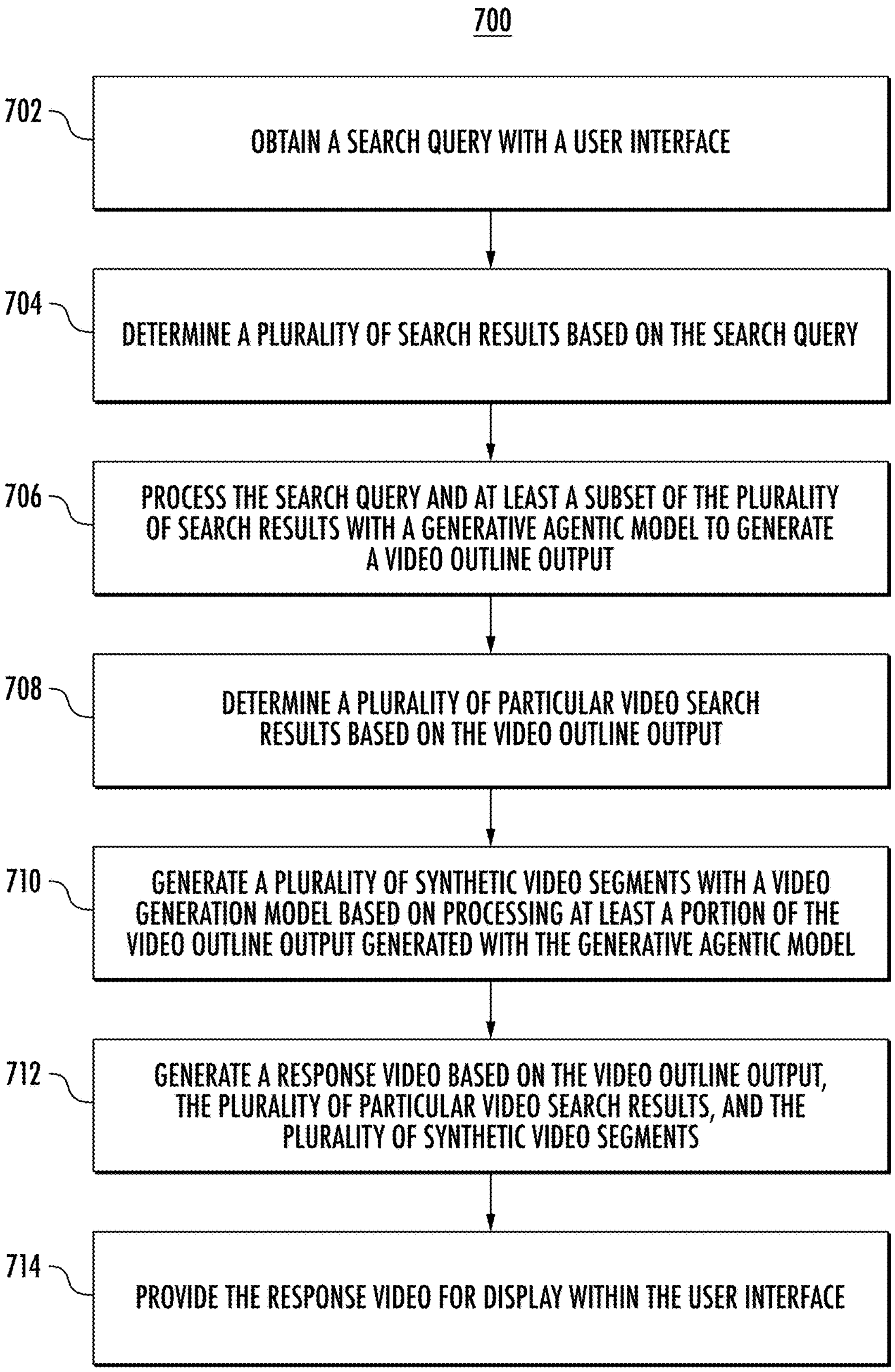
FIG. 7 depicts a flow chart diagram of an example method to perform hybrid video stitching according to example embodiments of the present disclosure.

FIG. 7 depicts a flow chart diagram of an example method to perform according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, a computing system can obtain a search query with a user interface. The search query can be associated with a request for information on a subject. The search query can include an image, a text string, an image-text pair, and/or other input. The user interface may include a search interface, a chat interface, a video player interface, and/or other user interface. The search query may be a chat entry within a chat interface. In some implementations, the search query may include a latent representation generated based on a chat history, a search history, and/or other set of data.

At 704, the computing system can determine a plurality of search results based on the search query. The plurality of search results can be determined to be responsive to the search query. The plurality of search results may be determined based on generating an embedding with the generative agentic model and then performing a search based on the embedding. The plurality of search results can include web pages, books, articles, social media posts, videos, images, and/or other content item.

At 706, the computing system can process the search query and at least a subset of the plurality of search results with a generative agentic model to generate a video outline output. The generative agentic model may have been tuned to generate a semantic plan for video generation and interface with an external tool to perform the semantic plan. The generative agentic model may be configured to generate the video outline output. The video outline output can be descriptive of a set of tasks for video generation. The video outline output may include an interface task for interfacing with one or more external tools to perform at least a subset of the set of tasks. In some implementations, the video outline output can include content item snippets from the plurality of search results, model-generated text segments, content item identifiers associated with videos from the plurality of search results, a video segment generation prompt, and a plurality of tool calls for interfacing with a plurality of external tools. The generative agentic model can include an autoregressive language model trained for next task prediction, tool call generation, and/or multi-part reasoning.

At 708, the computing system can determine a plurality of particular video search results based on the video outline output. The plurality of particular video search results can be associated with the subject and obtained from a plurality of web sources. The plurality of video search results may be part of the initial plurality of search results, may be determined separately from the initial plurality of search results, and/or may include a first subset from the plurality of search results and a second subset from a secondary search.

At 710, the computing system can generate a plurality of synthetic video segments with a video generation model based on processing at least a portion of the video outline output generated with the generative agentic model. The video generation model may include a video diffusion model. In some implementations, the video outline output may include one or more video generation prompts that are transmitted to and processed with the video generation model.

At 712, the computing system can generate a response video based on the video outline output, the plurality of particular video search results, and the plurality of synthetic video segments. The response video can include a plurality of pre-existing video segments and a plurality of model-generated video segments. In some implementations, the response video can include the plurality of model-generated video segments as transitions for providing additional details associated with content provided by the plurality of pre-existing video segments. The response video can be generated based on processing the video outline output, the plurality of particular video search results, and the plurality of synthetic video segments with the generative agentic model. The generative agentic model can perform video segment arrangement, cropping, segmenting, and stitching. In some implementations, the generative agentic model can perform audio generation and/or audio-video alignment. In some implementations, the response video can include a plurality of pre-existing video segments from the plurality of particular video search results and a plurality of model-generated video segments from the plurality of synthetic video segments.

At 714, the computing system can provide the response video for display within the user interface. The user interface may include a video player widget and/or a video player pop-up. The response video may be provided for automatic playback. The response video may be provided with a plurality of video anchors indicating the start of different video segments and/or indicating the start of different subtopic discussions.

In some implementations, the computing system can generate a plurality of source tags based on the plurality of particular video search results utilized to generate the response video. The plurality of source tags can be associated with the plurality of sources of the plurality of particular video search results. The computing system can process the response video to generate a plurality of source tag anchors descriptive of times within the response video in which respective video segments of the plurality of particular video search results are displayed. The computing system can associate the plurality of source tags with the plurality of source tag anchors. Providing the response video for display within the user interface can include, during video playback, providing a respective source tag of the plurality of source tags for display when a respective source tag anchor of the plurality of source tag anchors is reached. In some implementations, the plurality of source tags can include a plurality of selectable user interface elements that are selectable to navigate to a respective source of the plurality of sources of the plurality of particular video search results.

Figure 8:
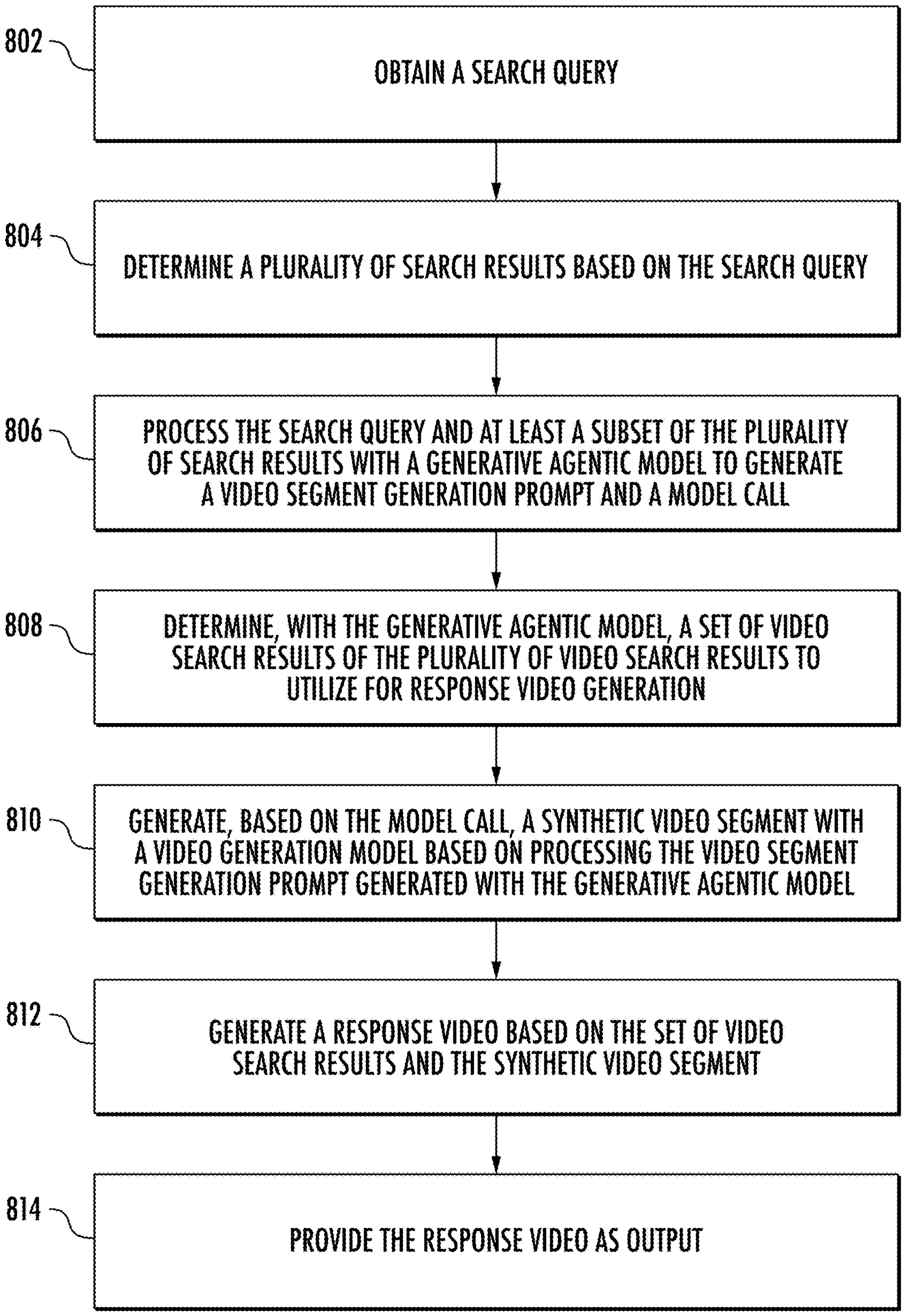
FIG. 8 depicts a flow chart diagram of an example method to perform query processing according to example embodiments of the present disclosure.

FIG. 8 depicts a flow chart diagram of an example method to perform according to example embodiments of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

At 802, a computing system can obtain a search query. The search query can be associated with a request for information on a subject. The subject can include a particular topic, which may include a particular object, place, person, and/or other topic. The search query may include text data, image data, audio data, video data, latent encoding data, multimodal data, and/or other data.

In some implementations, the computing system can obtain web data, process the web data to determine a trending topic, and generate the search query based on the trending topic. The trending topic can be determined based on trending search queries, based on news article trends, social media trends, and/or other trends. In some implementations, trending topics can be identified to pre-generate and store response videos that can then be provided to users without latency upon a user providing a search query associated with the trending topic. In some implementations, the response video may be generated based on a multi-turn conversation and/or a multi-search instance.

At 804, the computing system can determine a plurality of search results based on the search query. The plurality of search results can be determined to be responsive to the search query. The plurality of search results can include a plurality of video search results. The plurality of search results may be obtained based on one or more knowledge graphs. In some implementations, the plurality of search results may be obtained from a public database, a private database, a plurality of databases, and/or other sources. The plurality of search results may be obtained from vetted resources.

At 806, the computing system can process the search query and at least a subset of the plurality of search results with a generative agentic model to generate a video segment generation prompt and a model call. The generative agentic model may have been tuned and/or configured to generate a semantic plan for video generation and interface with an external tool to perform the semantic plan. The generative agentic model may be configured to generate the video outline output. The video outline output can be descriptive of a set of tasks for video generation. The video outline output may include an interface task for interfacing with an external tool to perform at least a subset of the set of tasks. In some implementations, the semantic plan may include a plurality of external tool calls associated with interfacing with a plurality of different external tools. The semantic plan may include a video segment generation prompt, an audio generation prompt, and a text generation prompt.

At 808, the computing system can determine, with the generative agentic model, a set of video search results of the plurality of video search results to utilize for response video generation. The particular video search result can be associated with the subject and obtained from a web source. The video search result selection may be based on topic diversity-based selection, resource vetting, and/or may be determined based on whether the video search result fits into the semantic plan. In some implementations, the plurality of search results may be filtered and/or queried based on the semantic plan.

At 810, the computing system can generate, based on the model call, a synthetic video segment with a video generation model based on processing the video segment generation prompt generated with the generative agentic model. The synthetic video segment can include a plurality of model-generated images organized in a particular sequence. The synthetic video segment may include audio generated with a different model or the same model.

At 812, the computing system can generate a response video based on the set of video search results and the synthetic video segment. The response video can include at least a portion of a pre-existing video and at least a portion of a model-generated video. The response video may include transitions generated based on the semantic plan generated with the generative agentic model. In some implementations, the response video can include at least a portion of the set of video search results and at least a portion of the synthetic video segment.

At 814, the computing system can provide the response video as output. The response video may be provided in a search interface, a chat interface, a video player interface, a virtual assistant interface, a generative model interface, and/or other interface. The response video can include metadata based tags.

In some implementations, the computing system can store the search query and the response video in an index database. The computing system can obtain a user query with a search interface, determine the user query is associated with the subject of the search query, and in response to determining the user query is associated with the subject of the search query, provide the response video for display with the search interface.

The video generation model can be part of a video generation system that synthesizes high-quality, high-resolution video with accompanying audio from text prompts and/or an input image. The architecture of the video generation model can be built upon a latent diffusion model. In some implementations, the video generation model may use autoencoders to compress video and audio into more efficient latent representations. The compressed format can allow the model to learn and operate more efficiently. The video generation model can include a transformer-based denoising network that has been trained to remove noise from these latent vectors. To generate a video, the model may begin with random Gaussian noise and iteratively apply the denoising network to produce the final video and audio output. The process can be performed jointly on both the audio and video latents, which may ensure synchronized output.

The model's capabilities can be a result of training on a dataset of images, videos, and audio. The training process may include annotating the data with detailed text captions using multiple generative multimodal models to enhance the variety and diversity of concepts the model could learn. The training data may be semantically deduplicated to minimize the risk of the model overfitting and merely replicating specific examples from the training set.

The model may be trained on Tensor Processing Units (TPUs), which can be designed to handle the massive computations required for large foundation models efficiently. The use of TPUs may provide scalability and may allow for the handling of large batch sizes, which may contribute to better model quality. The combination of a sophisticated latent diffusion architecture, meticulously curated training data, and powerful computational infrastructure can provide for state-of-the-art results in video generation.

Figure 9A:
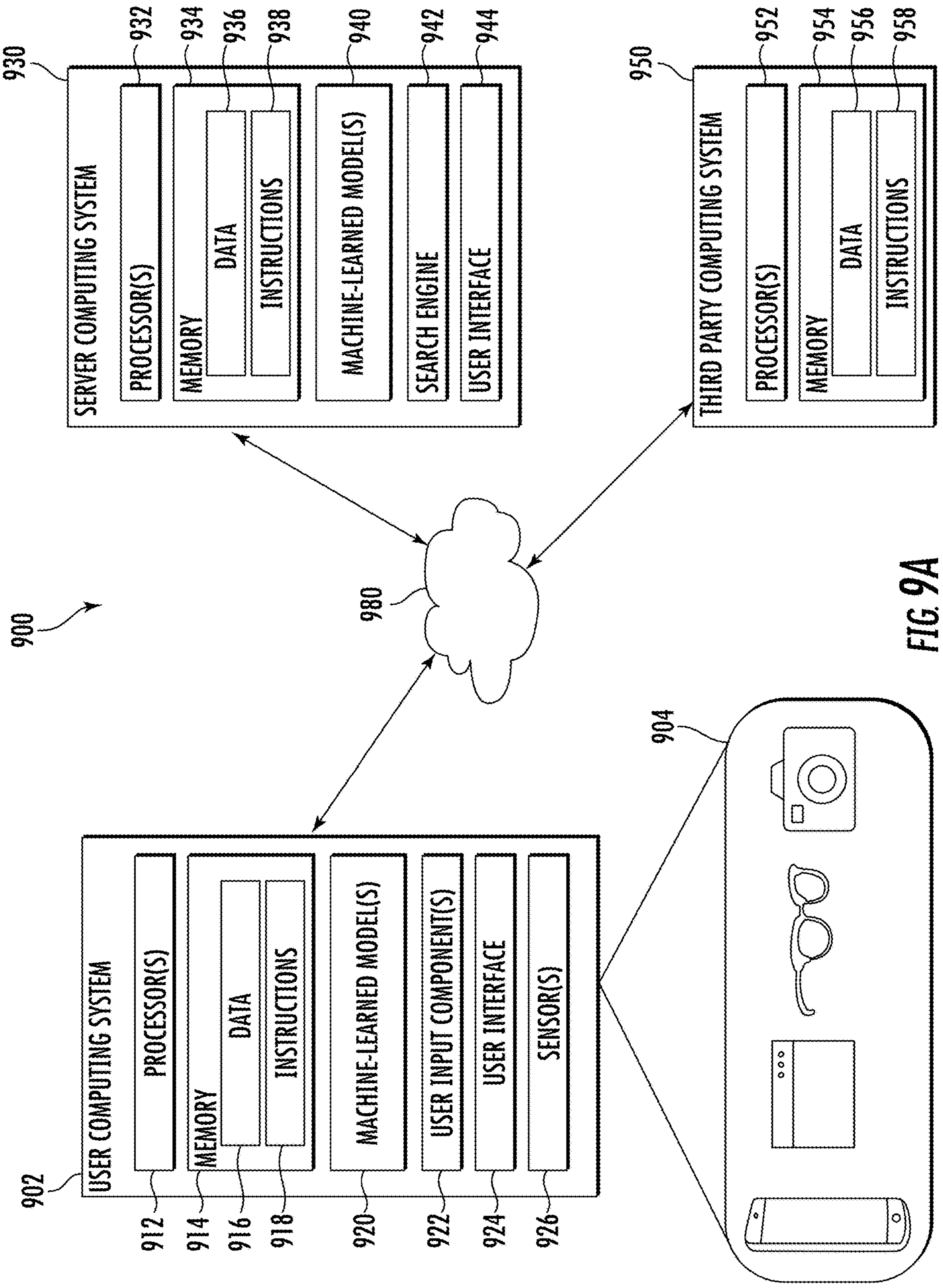
FIG. 9A depicts a block diagram of an example computing system that performs hybrid video generation according to example embodiments of the present disclosure.

FIG. 9A depicts a block diagram of an example computing system 900 that performs hybrid video generation according to example embodiments of the present disclosure. The system 900 includes a user computing system 902, a server computing system 930, and/or a third party computing system 950 that are communicatively coupled over a network 980.

The user computing system 902 can include any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing system 902 includes one or more processors 912 and a memory 914. The one or more processors 912 can be any suitable processing device (e.g., a processor core, a microprocessor, an ASIC, a FPGA, a controller, a microcontroller, etc.) and can be one processor or a plurality of processors that are operatively connected. The memory 914 can include one or more non-transitory computer-readable storage mediums, such as RAM, ROM, EEPROM, EPROM, flash memory devices, magnetic disks, etc., and combinations thereof. The memory 914 can store data 916 and instructions 918 which are executed by the processor 912 to cause the user computing system 902 to perform operations.

In some implementations, the user computing system 902 can store or include one or more machine-learned models 920. For example, the machine-learned models 920 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks.

In some implementations, the one or more machine-learned models 920 can be received from the server computing system 930 over network 980, stored in the user computing device memory 914, and then used or otherwise implemented by the one or more processors 912. In some implementations, the user computing system 902 can implement multiple parallel instances of a single machine-learned model 920 (e.g., to perform parallel machine-learned model processing across multiple instances of input data and/or detected features).

More particularly, the one or more machine-learned models 920 may include one or more detection models, one or more classification models, one or more segmentation models, one or more augmentation models, one or more generative models, one or more natural language processing models, one or more optical character recognition models, and/or one or more other machine-learned models. The one or more machine-learned models 920 can include one or more transformer models. The one or more machine-learned models 920 may include one or more neural radiance field models, one or more diffusion models, and/or one or more autoregressive language models.

The one or more machine-learned models 920 may be utilized to detect one or more object features. The detected object features may be classified and/or embedded. The classification and/or the embedding may then be utilized to perform a search to determine one or more search results. Alternatively and/or additionally, the one or more detected features may be utilized to determine an indicator (e.g., a user interface element that indicates a detected feature) is to be provided to indicate a feature has been detected. The user may then select the indicator to cause a feature classification, embedding, and/or search to be performed. In some implementations, the classification, the embedding, and/or the searching can be performed before the indicator is selected.

In some implementations, the one or more machine-learned models 920 can process image data, text data, audio data, and/or latent encoding data to generate output data that can include image data, text data, audio data, and/or latent encoding data. The one or more machine-learned models 920 may perform optical character recognition, natural language processing, image classification, object classification, text classification, audio classification, context determination, action prediction, image correction, image augmentation, text augmentation, sentiment analysis, object detection, error detection, inpainting, video stabilization, audio correction, audio augmentation, and/or data segmentation (e.g., mask based segmentation).

Machine-learned model(s) can be or include one or multiple machine-learned models or model components. Example machine-learned models can include neural networks (e.g., deep neural networks). Example machine-learned models can include non-linear models or linear models. Example machine-learned models can use other architectures in lieu of or in addition to neural networks. Example machine-learned models can include decision tree based models, support vector machines, hidden Markov models, Bayesian networks, linear regression models, k-means clustering models, etc.

Example neural networks can include feed-forward neural networks, recurrent neural networks (RNNs), including long short-term memory (LSTM) based recurrent neural networks, convolutional neural networks (CNNs), diffusion models, generative-adversarial networks, or other forms of neural networks. Example neural networks can be deep neural networks. Some example machine-learned models can leverage an attention mechanism such as self-attention. For example, some example machine-learned models can include multi-headed self-attention models.

Machine-learned model(s) can include a single or multiple instances of the same model configured to operate on data from input(s). Machine-learned model(s) can include an ensemble of different models that can cooperatively interact to process data from input(s). For example, machine-learned model(s) can employ a mixture-of-experts structure. See, e.g., Zhou et al., *Mixture-of-Experts with Expert Choice Routing*, ARXIV: 2202.09368v2 (Oct. 14, 2022).

Input(s) can generally include or otherwise represent various types of data. Input(s) can include one type or many different types of data. Output(s) can be data of the same type(s) or of different types of data as compared to input(s). Output(s) can include one type or many different types of data.

Example data types for input(s) or output(s) include natural language text data, software code data (e.g., source code, object code, machine code, or any other form of computer-readable instructions or programming languages), machine code data (e.g., binary code, assembly code, or other forms of machine-readable instructions that can be executed directly by a computer's central processing unit), assembly code data (e.g., low-level programming languages that use symbolic representations of machine code instructions to program a processing unit), genetic data or other chemical or biochemical data, image data, audio data, audiovisual data, haptic data, biometric data, medical data, financial data, statistical data, geographical data, astronomical data, historical data, sensor data generally (e.g., digital or analog values, such as voltage or other absolute or relative level measurement values from a real or artificial input, such as from an audio sensor, light sensor, displacement sensor, etc.), and the like. Data can be raw or processed and can be in any format or schema.

In multimodal inputs or outputs, example combinations of data types include image data and audio data, image data and natural language data, natural language data and software code data, image data and biometric data, sensor data and medical data, etc. It is to be understood that any combination of data types in an input or an output can be present.

An example input can include one or multiple data types, such as the example data types noted above. An example output can include one or multiple data types, such as the example data types noted above. The data type(s) of input can be the same as or different from the data type(s) of output. It is to be understood that the example data types noted above are provided for illustrative purposes only. Data types contemplated within the scope of the present disclosure are not limited to those examples noted above.

Additionally or alternatively, one or more machine-learned models 940 can be included in or otherwise stored and implemented by the server computing system 930 that communicates with the user computing system 902 according to a client-server relationship. For example, the machine-learned models 940 can be implemented by the server computing system 930 as a portion of a web service (e.g., a viewfinder service, a visual search service, an image processing service, an ambient computing service, and/or an overlay application service). Thus, one or more models 920 can be stored and implemented at the user computing system 902 and/or one or more models 940 can be stored and implemented at the server computing system 930.

The user computing system 902 can also include one or more user input components 922 that receives user input. For example, the user input component 922 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

In some implementations, the user computing system 902 can store and/or provide one or more user interfaces 924, which may be associated with one or more applications. The one or more user interfaces 924 can be configured to receive inputs and/or provide data for display (e.g., image data, text data, audio data, one or more user interface elements, an augmented-reality experience, a virtual reality experience, and/or other data for display. The user interfaces 924 may be associated with one or more other computing systems (e.g., server computing system 930 and/or third party computing system 950). The user interfaces 924 can include a viewfinder interface, a search interface, a generative model interface, a social media interface, and/or a media content gallery interface.

The user computing system 902 may include and/or receive data from one or more sensors 926. The one or more sensors 926 may be housed in a housing component that houses the one or more processors 912, the memory 914, and/or one or more hardware components, which may store, and/or cause to perform, one or more software packets. The one or more sensors 926 can include one or more image sensors (e.g., a camera), one or more lidar sensors, one or more audio sensors (e.g., a microphone), one or more inertial sensors (e.g., inertial measurement unit), one or more biological sensors (e.g., a heart rate sensor, a pulse sensor, a retinal sensor, and/or a fingerprint sensor), one or more infrared sensors, one or more location sensors (e.g., GPS), one or more touch sensors (e.g., a conductive touch sensor and/or a mechanical touch sensor), and/or one or more other sensors. The one or more sensors can be utilized to obtain data associated with a user's environment (e.g., an image of a user's environment, a recording of the environment, and/or the location of the user).

The user computing system 902 may include, and/or be part of, a user computing device 904. The user computing device 904 may include a mobile computing device (e.g., a smartphone or tablet), a desktop computer, a laptop computer, a smart wearable, and/or a smart appliance. Additionally and/or alternatively, the user computing system may obtain from, and/or generate data with, the one or more user computing devices 904. For example, a camera of a smartphone may be utilized to capture image data descriptive of the environment, and/or an overlay application of the user computing device 904 can be utilized to track and/or process the data being provided to the user. Similarly, one or more sensors associated with a smart wearable may be utilized to obtain data about a user and/or about a user's environment (e.g., image data can be obtained with a camera housed in a user's smart glasses). Additionally and/or alternatively, the data may be obtained and uploaded from other user devices that may be specialized for data obtainment or generation.

The server computing system 930 includes one or more processors 932 and a memory 934. The one or more processors 932 can be any suitable processing device (e.g., a processor core, a microprocessor, an ASIC, a FPGA, a controller, a microcontroller, etc.) and can be one processor or a plurality of processors that are operatively connected. The memory 934 can include one or more non-transitory computer-readable storage mediums, such as RAM, ROM, EEPROM, EPROM, flash memory devices, magnetic disks, etc., and combinations thereof. The memory 934 can store data 936 and instructions 938 which are executed by the processor 932 to cause the server computing system 930 to perform operations.

In some implementations, the server computing system 930 includes or is otherwise implemented by one or more server computing devices. In instances in which the server computing system 930 includes plural server computing devices, such server computing devices can operate according to sequential computing architectures, parallel computing architectures, or some combination thereof.

As described above, the server computing system 930 can store or otherwise include one or more machine-learned models 940. For example, the models 940 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 940 are discussed with reference to FIG. 9B.

Additionally and/or alternatively, the server computing system 930 can include and/or be communicatively connected with a search engine 942 that may be utilized to crawl one or more databases (and/or resources). The search engine 942 can process data from the user computing system 902, the server computing system 930, and/or the third party computing system 950 to determine one or more search results associated with the input data. The search engine 942 may perform term based search, label based search, Boolean based searches, image search, embedding based search (e.g., nearest neighbor search), multimodal search, and/or one or more other search techniques.

The server computing system 930 may store and/or provide one or more user interfaces 944 for obtaining input data and/or providing output data to one or more users. The one or more user interfaces 944 can include one or more user interface elements, which may include input fields, navigation tools, content chips, selectable tiles, widgets, data display carousels, dynamic animation, informational pop-ups, image augmentations, text-to-speech, speech-to-text, augmented-reality, virtual-reality, feedback loops, and/or other interface elements.

The user computing system 902 and/or the server computing system 930 can train the models 920 and/or 940 via interaction with the third party computing system 950 that is communicatively coupled over the network 980. The third party computing system 950 can be separate from the server computing system 930 or can be a portion of the server computing system 930. Alternatively and/or additionally, the third party computing system 950 may be associated with one or more web resources, one or more web platforms, one or more other users, and/or one or more contexts.

An example machine-learned model can include a generative model (e.g., a large language model, a foundation model, a vision language model, an image generation model, a text-to-image model, an audio generation model, and/or other generative models).

Training and/or tuning the machine-learned model can include obtaining a training instance. A set of training data can include a plurality of training instances divided between multiple datasets (e.g., a training dataset, a validation dataset, or testing dataset). A training instance can be labeled or unlabeled. The runtime inferences can form training instances when a model is trained using an evaluation of the model's performance on that runtime instance (e.g., online training/learning). Example data types for the training instance and various tasks associated therewith are described throughout the present disclosure.

The third party computing system 950 can include one or more processors 952 and a memory 954. The one or more processors 952 can be any suitable processing device (e.g., a processor core, a microprocessor, an ASIC, a FPGA, a controller, a microcontroller, etc.) and can be one processor or a plurality of processors that are operatively connected. The memory 954 can include one or more non-transitory computer-readable storage mediums, such as RAM, ROM, EEPROM, EPROM, flash memory devices, magnetic disks, etc., and combinations thereof. The memory 954 can store data 956 and instructions 958 which are executed by the processor 952 to cause the third party computing system 950 to perform operations. In some implementations, the third party computing system 950 includes or is otherwise implemented by one or more server computing devices.

The network 980 can be any type of communications network, such as a local area network (e.g., intranet), wide area network (e.g., Internet), or some combination thereof and can include any number of wired or wireless links. In general, communication over the network 980 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some implementations, the task can be a generative task, and the one or more machine-learned models (e.g., 920 and/or 940) can be configured to output content generated in view of one or more inputs. For instance, the inputs can be or otherwise represent data of one or more modalities that encodes context for generating additional content.

In some implementations, the task can be a text completion task. The machine-learned models can be configured to process the inputs that represent textual data and to generate the outputs that represent additional textual data that completes a textual sequence that includes the inputs. For instance, the machine-learned models can be configured to generate the outputs to complete a sentence, paragraph, or portion of text that follows from a portion of text represented by inputs.

In some implementations, the task can be an instruction following task. The machine-learned models can be configured to process the inputs that represent instructions to perform a function and to generate the outputs that advance a goal of satisfying the instruction function (e.g., at least a step of a multi-step procedure to perform the function). The outputs can represent data of the same or of a different modality as the inputs. For instance, the inputs can represent textual data (e.g., natural language instructions for a task to be performed) and the machine-learned models can process the inputs to generate the outputs that represent textual data responsive to the instructions (e.g., natural language responses, programming language responses, machine language responses, etc.). The inputs can represent image data (e.g., image-based instructions for a task to be performed, optionally accompanied by textual instructions) and the machine-learned models can process the inputs to generate the outputs that represent textual data responsive to the instructions (e.g., natural language responses, programming language responses, machine language responses, etc.). One or more outputs can be iteratively or recursively generated to sequentially process and accomplish steps toward accomplishing the requested functionality. For instance, an initial output can be executed by an external system or be processed by the machine-learned models to complete an initial step of performing a function. Multiple steps can be performed, with a final output being obtained that is responsive to the initial instructions.

In some implementations, the task can be a question answering task. The machine-learned models can be configured to process the inputs that represent a question to answer and to generate the outputs that advance a goal of returning an answer to the question (e.g., at least a step of a multi-step procedure to perform the function). The outputs can represent data of the same or of a different modality as the inputs. For instance, the inputs can represent textual data (e.g., natural language instructions for a task to be performed) and the machine-learned models can process the inputs to generate the outputs that represent textual data responsive to the question (e.g., natural language responses, programming language responses, machine language responses, etc.). The inputs can represent image data (e.g., image-based instructions for a task to be performed, optionally accompanied by textual instructions) and the machine-learned models can process the inputs to generate the outputs that represent textual data responsive to the question (e.g., natural language responses, programming language responses, machine language responses, etc.). One or more outputs can be iteratively or recursively generated to sequentially process and accomplish steps toward answering the question. For instance, an initial output can be executed by an external system or be processed by the machine-learned models to complete an initial step of obtaining an answer to the question (e.g., querying a database, performing a computation, executing a script, etc.). Multiple steps can be performed, with a final output being obtained that is responsive to the question.

In some implementations, the task can be an image generation task. The machine-learned models can be configured to process the inputs that represent context regarding a desired portion of image content. The context can include text data, image data, audio data, etc. Machine-learned models can be configured to generate the outputs that represent image data that depicts imagery related to the context. For instance, the machine-learned models can be configured to generate pixel data of an image. Values for channels associated with the pixels in the pixel data can be selected based on the context (e.g., based on a probability determined based on the context).

In some implementations, the task can be an audio generation task. Machine-learned models can be configured to process the inputs that represent context regarding a desired portion of audio content. The context can include text data, image data, audio data, etc. The machine-learned models can be configured to generate the outputs that represent audio data related to the context. For instance, the machine-learned models can be configured to generate waveform data in the form of an image (e.g., a spectrogram). Values for channels associated with pixels of the image can be selected based on the context. The machine-learned models can be configured to generate waveform data in the form of a sequence of discrete samples of a continuous waveform. Values of the sequence can be selected based on the context (e.g., based on a probability determined based on the context).

In some implementations, the task can be a data generation task. Machine-learned models can be configured to process the inputs that represent context regarding a desired portion of data (e.g., data from various data domains, such as sensor data, image data, multimodal data, statistical data, etc.). The desired data can be, for instance, synthetic data for training other machine-learned models. The context can include arbitrary data types. The machine-learned models can be configured to generate the outputs that represent data that aligns with the desired data. For instance, the machine-learned models can be configured to generate data values for populating a dataset. Values for the data objects can be selected based on the context (e.g., based on a probability determined based on the context).

The user computing system may include a number of applications (e.g., applications 1 through N). Each application may include its own respective machine learning library and machine-learned model(s). For example, each application can include a machine-learned model. Example applications include a text messaging application, an email application, a dictation application, a virtual keyboard application, a browser application, etc.

Each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

The user computing system 902 can include a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer can include a number of machine-learned models. For example a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing system 900.

The central intelligence layer can communicate with a central device data layer. The central device data layer can be a centralized repository of data for the computing system 900. The central device data layer may communicate with a number of other components of the computing device, such as, for example, one or more sensors, a context manager, a device state component, and/or additional components. In some implementations, the central device data layer can communicate with each device component using an API (e.g., a private API).

Figure 9B:
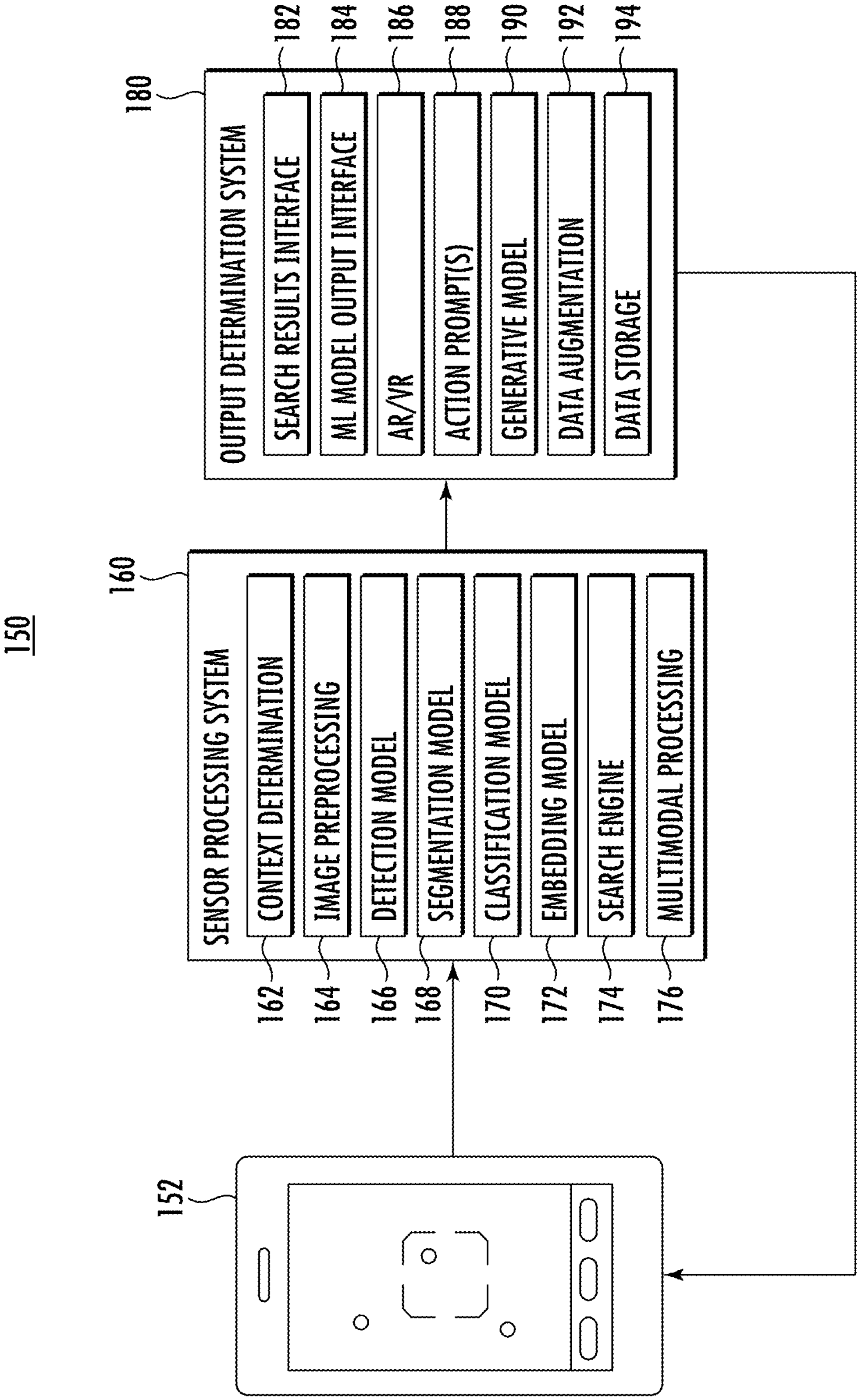
FIG. 9B depicts a block diagram of an example computing system that performs hybrid video generation according to example embodiments of the present disclosure.

FIG. 9B depicts a block diagram of an example computing system 150 that performs hybrid video generation according to example embodiments of the present disclosure. In particular, the example computing system 150 can include one or more computing devices 152 that can be utilized to obtain, and/or generate, one or more datasets that can be processed by a sensor processing system 160 and/or an output determination system 180 to feedback to a user that can provide information on features in the one or more obtained datasets. The one or more datasets can include image data, text data, audio data, multimodal data, latent encoding data, etc. The one or more datasets may be obtained via one or more sensors associated with the one or more computing devices 152 (e.g., one or more sensors in the computing device 152). Additionally and/or alternatively, the one or more datasets can be stored data and/or retrieved data (e.g., data retrieved from a web resource). For example, images, text, and/or other content items may be interacted with by a user. The interacted with content items can then be utilized to generate one or more determinations.

The one or more computing devices 152 can obtain, and/or generate, one or more datasets based on image capture, sensor tracking, data storage retrieval, content download (e.g., downloading an image or other content item via the internet from a web resource), and/or via one or more other techniques. The one or more datasets can be processed with a sensor processing system 160. The sensor processing system 160 may perform one or more processing techniques using one or more machine-learned models, one or more search engines, and/or one or more other processing techniques. The one or more processing techniques can be performed in any combination and/or individually. The one or more processing techniques can be performed in series and/or in parallel. In particular, the one or more datasets can be processed with a context determination block 162, which may determine a context associated with one or more content items. The context determination block 162 may identify and/or process metadata, user profile data (e.g., preferences, user search history, user browsing history, user purchase history, and/or user input data), previous interaction data, global trend data, location data, time data, and/or other data to determine a particular context associated with the user. The context can be associated with an event, a determined trend, a particular action, a particular type of data, a particular environment, and/or another context associated with the user and/or the retrieved or obtained data.

The sensor processing system 160 may include an image preprocessing block 164. The image preprocessing block 164 may be utilized to adjust one or more values of an obtained and/or received image to prepare the image to be processed by one or more machine-learned models and/or one or more search engines 174. The image preprocessing block 164 may resize the image, adjust saturation values, adjust resolution, strip and/or add metadata, and/or perform one or more other operations.

In some implementations, the sensor processing system 160 can include one or more machine-learned models, which may include a detection model 166, a segmentation model 168, a classification model 170, an embedding model 172, and/or one or more other machine-learned models. For example, the sensor processing system 160 may include one or more detection models 166 that can be utilized to detect particular features in the processed dataset. In particular, one or more images can be processed with the one or more detection models 166 to generate one or more bounding boxes associated with detected features in the one or more images.

Additionally and/or alternatively, one or more segmentation models 168 can be utilized to segment one or more portions of the dataset from the one or more datasets. For example, the one or more segmentation models 168 may utilize one or more segmentation masks (e.g., one or more segmentation masks manually generated and/or generated based on the one or more bounding boxes) to segment a portion of an image, a portion of an audio file, and/or a portion of text. The segmentation may include isolating one or more detected objects and/or removing one or more detected objects from an image.

The one or more classification models 170 can be utilized to process image data, text data, audio data, latent encoding data, multimodal data, and/or other data to generate one or more classifications. The one or more classification models 170 can include one or more image classification models, one or more object classification models, one or more text classification models, one or more audio classification models, and/or one or more other classification models. The one or more classification models 170 can process data to determine one or more classifications.

In some implementations, data may be processed with one or more embedding models 172 to generate one or more embeddings. For example, one or more images can be processed with the one or more embedding models 172 to generate one or more image embeddings in an embedding space. The one or more image embeddings may be associated with one or more image features of the one or more images. In some implementations, the one or more embedding models 172 may be configured to process multimodal data to generate multimodal embeddings. The one or more embeddings can be utilized for classification, search, and/or learning embedding space distributions.

The sensor processing system 160 may include one or more search engines 174 that can be utilized to perform one or more searches. The one or more search engines 174 may crawl one or more databases (e.g., one or more local databases, one or more global databases, one or more private databases, one or more public databases, one or more specialized databases, and/or one or more general databases) to determine one or more search results. The one or more search engines 174 may perform feature matching, text based search, embedding based search (e.g., k-nearest neighbor search), metadata based search, multimodal search, web resource search, image search, text search, and/or application search.

Additionally and/or alternatively, the sensor processing system 160 may include one or more multimodal processing blocks 176, which can be utilized to aid in the processing of multimodal data. The one or more multimodal processing blocks 176 may include generating a multimodal query and/or a multimodal embedding to be processed by one or more machine-learned models and/or one or more search engines 174.

The output(s) of the sensor processing system 160 can then be processed with an output determination system 180 to determine one or more outputs to provide to a user. The output determination system 180 may include heuristic based determinations, machine-learned model based determinations, user selection based determinations, and/or context based determinations.

The output determination system 180 may determine how and/or where to provide the one or more search results in a search results interface 182. Additionally and/or alternatively, the output determination system 180 may determine how and/or where to provide the one or more machine-learned model outputs in a machine-learned model output interface 184. In some implementations, the one or more search results and/or the one or more machine-learned model outputs may be provided for display via one or more user interface elements. The one or more user interface elements may be overlayed over displayed data. For example, one or more detection indicators may be overlayed over detected objects in a viewfinder. The one or more user interface elements may be selectable to perform one or more additional searches and/or one or more additional machine-learned model processes. In some implementations, the user interface elements may be provided as specialized user interface elements for specific applications and/or may be provided uniformly across different applications. The one or more user interface elements can include pop-up displays, interface overlays, interface tiles and/or chips, carousel interfaces, audio feedback, animations, interactive widgets, and/or other user interface elements.

Additionally and/or alternatively, data associated with the output(s) of the sensor processing system 160 may be utilized to generate and/or provide an augmented-reality experience and/or a virtual-reality experience 186. For example, the one or more obtained datasets may be processed to generate one or more augmented-reality rendering assets and/or one or more virtual-reality rendering assets, which can then be utilized to provide an augmented-reality experience and/or a virtual-reality experience 186 to a user. The augmented-reality experience may render information associated with an environment into the respective environment. Alternatively and/or additionally, objects related to the processed dataset(s) may be rendered into the user environment and/or a virtual environment. Rendering dataset generation may include training one or more neural radiance field models to learn a three-dimensional representation for one or more objects.

In some implementations, one or more action prompts 188 may be determined based on the output(s) of the sensor processing system 160. For example, a search prompt, a purchase prompt, a generate prompt, a reservation prompt, a call prompt, a redirect prompt, and/or one or more other prompts may be determined to be associated with the output(s) of the sensor processing system 160. The one or more action prompts 188 may then be provided to the user via one or more selectable user interface elements. In response to a selection of the one or more selectable user interface elements, a respective action of the respective action prompt may be performed (e.g., a search may be performed, a purchase application programming interface may be utilized, and/or another application may be opened).

In some implementations, the one or more datasets and/or the output(s) of the sensor processing system 160 may be processed with one or more generative models 190 to generate a model-generated content item that can then be provided to a user. The generation may be prompted based on a user selection and/or may be automatically performed (e.g., automatically performed based on one or more conditions, which may be associated with a threshold amount of search results not being identified).

The one or more generative models 190 can include language models (e.g., large language models and/or vision language models), image generation models (e.g., text-to-image generation models and/or image augmentation models), audio generation models, video generation models, graph generation models, and/or other data generation models (e.g., other content generation models). The one or more generative models 190 can include one or more transformer models, one or more convolutional neural networks, one or more recurrent neural networks, one or more feedforward neural networks, one or more generative adversarial networks, one or more self-attention models, one or more embedding models, one or more encoders, one or more decoders, and/or one or more other models. In some implementations, the one or more generative models 190 can include one or more autoregressive models (e.g., a machine-learned model trained to generate predictive values based on previous behavior data) and/or one or more diffusion models (e.g., a machine-learned model trained to generate predicted data based on generating and processing distribution data associated with the input data).

The one or more generative models 190 can be trained to process input data and generate model-generated content items, which may include a plurality of predicted words, pixels, signals, and/or other data. The model-generated content items may include novel content items that are not the same as any pre-existing work. The one or more generative models 190 can leverage learned representations, sequences, and/or probability distributions to generate the content items, which may include phrases, storylines, settings, objects, characters, beats, lyrics, and/or other aspects that are not included in pre-existing content items.

The one or more generative models 190 may include a vision language model.

The vision language model can be trained, tuned, and/or configured to process image data and/or text data to generate a natural language output. The vision language model may leverage a pre-trained large language model (e.g., a large autoregressive language model) with one or more encoders (e.g., one or more image encoders and/or one or more text encoders) to provide detailed natural language outputs that emulate natural language composed by a human.

The vision language model may be utilized for zero-shot image classification, few shot image classification, image captioning, multimodal query distillation, multimodal question and answering, and/or may be tuned and/or trained for a plurality of different tasks. The vision language model can perform visual question answering, image caption generation, feature detection (e.g., content monitoring (e.g., for inappropriate content)), object detection, scene recognition, and/or other tasks.

The vision language model may leverage a pre-trained language model that may then be tuned for multimodality.

Training and/or tuning of the vision language model can include image-text matching, masked-language modeling, multimodal fusing with cross attention, contrastive learning, prefix language model training, and/or other training techniques. For example, the vision language model may be trained to process an image to generate predicted text that is similar to ground truth text data (e.g., a ground truth caption for the image). In some implementations, the vision language model may be trained to replace masked tokens of a natural language template with textual tokens descriptive of features depicted in an input image. Alternatively and/or additionally, the training, tuning, and/or model inference may include multi-layer concatenation of visual and textual embedding features. In some implementations, the vision language model may be trained and/or tuned via jointly learning image embedding and text embedding generation, which may include training and/or tuning a system to map embeddings to a joint feature embedding space that maps text features and image features into a shared embedding space. The joint training may include image-text pair parallel embedding and/or may include triplet training. In some implementations, the images may be utilized and/or processed as prefixes to the language model.

The one or more generative models 190 may be stored on-device and/or may be stored on a server computing system. In some implementations, the one or more generative models 190 can perform on-device processing to determine suggested searches, suggested actions, and/or suggested prompts. The one or more generative models 190 may include one or more compact vision language models that may include less parameters than a vision language model stored and operated by the server computing system. The compact vision language model may be trained via distillation training. In some implementations, the vision language model may process the display data to generate suggestions. The display data can include a single image descriptive of a screenshot and/or may include image data, metadata, and/or other data descriptive of a period of time preceding the current displayed content (e.g., the applications, images, videos, messages, and/or other content viewed within the past 30 seconds). The user computing device may generate and store a rolling buffer window (e.g., 30 seconds) of data descriptive of content displayed during the buffer. Once the time has elapsed, the data may be deleted. The rolling buffer window data may be utilized to determine a context, which can be leveraged for query, content, action, and/or prompt suggestion.

In some implementations, the generative models 190 can include machine-learned sequence processing models. An example system can pass inputs to sequence processing models. Sequence processing models can include one or more machine-learned components. Sequence processing models can process the data from inputs to obtain an input sequence. Input sequence can include one or more input elements obtained from inputs. The sequence processing model can process the input sequence using prediction layers to generate an output sequence. The output sequence can include one or more output elements generated based on input sequence. The system can generate outputs based on output sequence.

The output determination system 180 may process the one or more datasets and/or the output(s) of the sensor processing system 160 with a data augmentation block 192 to generate augmented data. For example, one or more images can be processed with the data augmentation block 192 to generate one or more augmented images. The data augmentation can include data correction, data cropping, the removal of one or more features, the addition of one or more features, a resolution adjustment, a lighting adjustment, a saturation adjustment, and/or other augmentation.

In some implementations, the one or more datasets and/or the output(s) of the sensor processing system 160 may be stored based on a data storage block 194 determination.

The output(s) of the output determination system 180 can then be provided to a user via one or more output components of the user computing device 152. For example, one or more user interface elements associated with the one or more outputs can be provided for display via a visual display of the user computing device 152.

The processes may be performed iteratively and/or continuously. One or more user inputs to the provided user interface elements may condition and/or affect successive processing loops.

Figure 10:
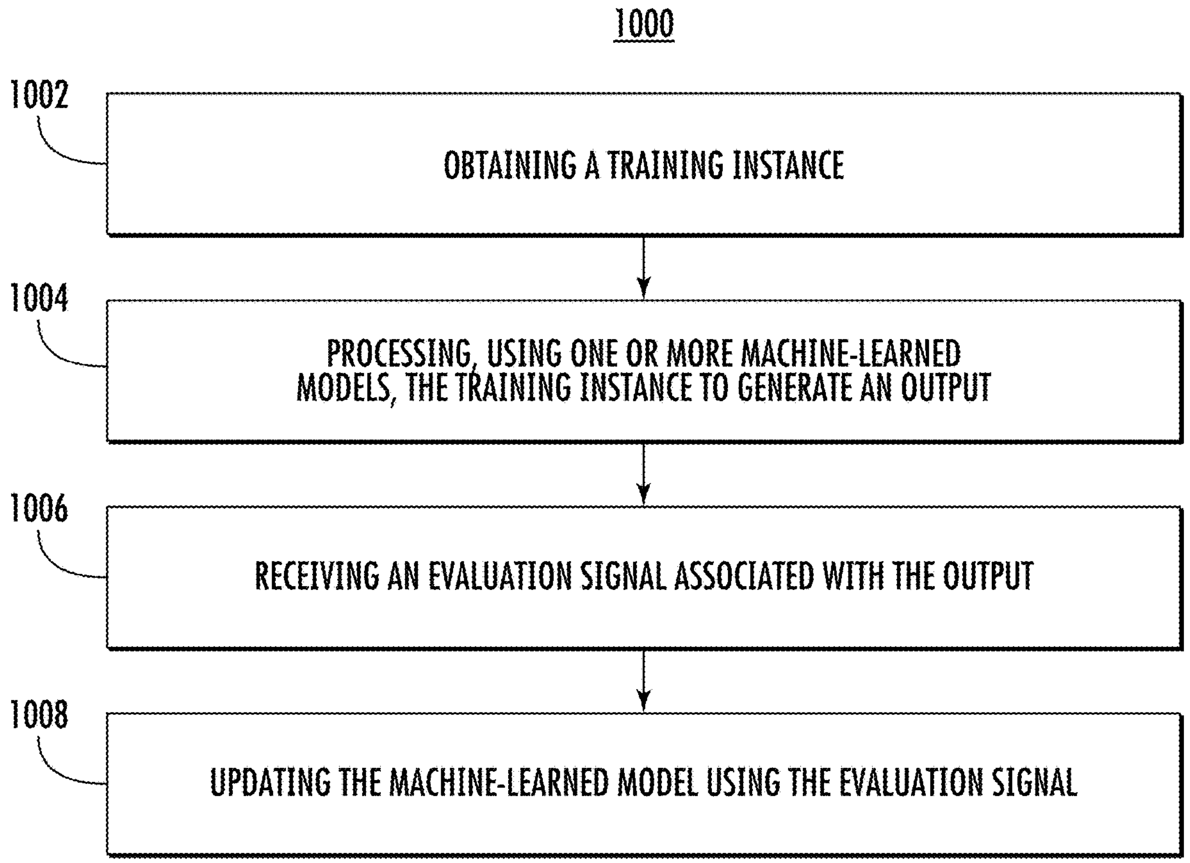
FIG. 10 depicts a flow chart diagram illustrating an example method for training a machine-learned model according to example implementations of aspects of the present disclosure.

FIG. 10 depicts a flowchart of a method 1000 for training one or more machine-learned models according to aspects of the present disclosure. For instance, an example machine-learned model can include a generative agentic model, a video generation model, an audio generation model, a diffusion model, a classification model, and/or other models.

One or more portion(s) of example method 1000 can be implemented by a computing system that includes one or more computing devices such as, for example, computing systems described with reference to the other figures. Each respective portion of example method 1000 can be performed by any (or any combination) of one or more computing devices. Moreover, one or more portion(s) of example method 1000 can be implemented on the hardware components of the device(s) described herein, for example, to train one or more systems or models. FIG. 10 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 10 is described with reference to elements/terms described with respect to other systems and figures for exemplary illustrated purposes and is not meant to be limiting. One or more portions of example method 1000 can be performed additionally, or alternatively, by other systems.

At 1002, example method 1000 can include obtaining a training instance. A set of training data can include a plurality of training instances divided between multiple datasets (e.g., a training dataset, a validation dataset, or testing dataset). A training instance can be labeled or unlabeled. Although referred to in example method 1000 as a "training" instance, it is to be understood that runtime inferences can form training instances when a model is trained using an evaluation of the model's performance on that runtime instance (e.g., online training/learning). Example data types for the training instance and various tasks associated therewith are described throughout the present disclosure.

At 1004, example method 1000 can include processing, using one or more machine-learned models, the training instance to generate an output. The output can be directly obtained from the one or more machine-learned models or can be a downstream result of a chain of processing operations that includes an output of the one or more machine-learned models.

At 1006, example method 1000 can include receiving an evaluation signal associated with the output. The evaluation signal can be obtained using a loss function. Various determinations of loss can be used, such as mean squared error, likelihood loss, cross entropy loss, hinge loss, contrastive loss, or various other loss functions. The evaluation signal can be computed using known ground-truth labels (e.g., supervised learning), predicted or estimated labels (e.g., semi- or self-supervised learning), or without labels (e.g., unsupervised learning). The evaluation signal can be a reward (e.g., for reinforcement learning). The reward can be computed using a machine-learned reward model configured to generate rewards based on output(s) received. The reward can be computed using feedback data describing human feedback on the output(s).

At 1008, example method 1000 can include updating the machine-learned model using the evaluation signal. For example, values for parameters of the machine-learned model(s) can be learned, in some embodiments, using various training or learning techniques, such as, for example, backwards propagation. For example, the evaluation signal can be backpropagated from the output (or another source of the evaluation signal) through the machine-learned model(s) to update one or more parameters of the model(s) (e.g., based on a gradient of the evaluation signal with respect to the parameter value(s)). For example, system(s) containing one or more machine-learned models can be trained in an end-to-end manner. Gradient descent techniques can be used to iteratively update the parameters over a number of training iterations. In some implementations, performing backwards propagation of errors can include performing truncated backpropagation through time. Example method 1000 can include implementing a number of generalization techniques (e.g., weight decays, dropouts, etc.) to improve the generalization capability of the models being trained.

In some implementations, example method 1000 can be implemented for training a machine-learned model from an initialized state to a fully trained state (e.g., when the model exhibits a desired performance profile, such as based on accuracy, precision, recall, etc.).

In some implementations, example method 1000 can be implemented for particular stages of a training procedure. For instance, in some implementations, example method 1000 can be implemented for pre-training a machine-learned model. Pre-training can include, for instance, large-scale training over potentially noisy data to achieve a broad base of performance levels across a variety of tasks/data types. In some implementations, example method 1000 can be implemented for fine-tuning a machine-learned model. Fine-tuning can include, for instance, smaller-scale training on higher-quality (e.g., labeled, curated, etc.) data. Fine-tuning can affect all or a portion of the parameters of a machine-learned model. For example, various portions of the machine-learned model can be "frozen" for certain training stages. For example, parameters associated with an embedding space can be "frozen" during fine-tuning (e.g., to retain information learned from a broader domain(s) than present in the fine-tuning dataset(s)). An example fine-tuning approach includes reinforcement learning. Reinforcement learning can be based on user feedback on model performance during use.

Figure 11:
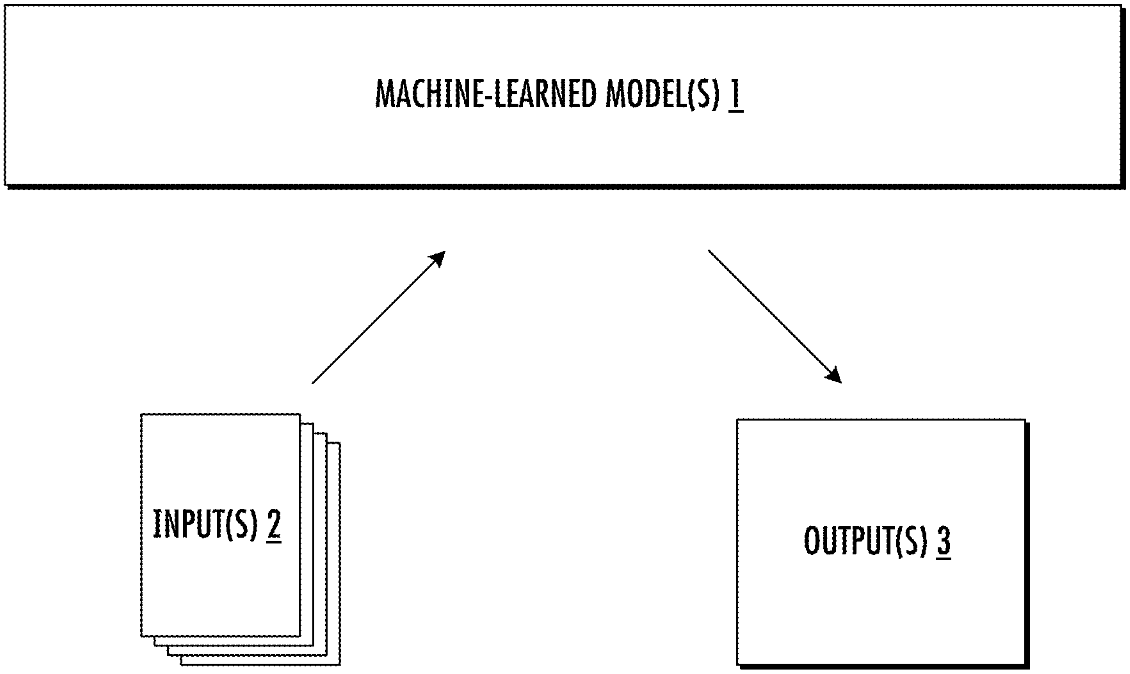
FIG. 11 depicts a block diagram of an example processing flow for using machine-learned model(s) to process input(s) to generate output(s) according to example implementations of aspects of the present disclosure.

FIG. 11 is a block diagram of an example processing flow for using machine-learned model(s) 1 to process input(s) 2 to generate output(s) 3.

Machine-learned model(s) 1 can be or include one or multiple machine-learned models or model components. Example machine-learned models can include neural networks (e.g., deep neural networks). Example machine-learned models can include non-linear models or linear models. Example machine-learned models can use other architectures in lieu of or in addition to neural networks. Example machine-learned models can include decision tree based models, support vector machines, hidden Markov models, Bayesian networks, linear regression models, k-means clustering models, etc.

Example neural networks can include feed-forward neural networks, recurrent neural networks (RNNs), including long short-term memory (LSTM) based recurrent neural networks, convolutional neural networks (CNNs), diffusion models, generative-adversarial networks, or other forms of neural networks. Example neural networks can be deep neural networks. Some example machine-learned models can leverage an attention mechanism such as self-attention. For example, some example machine-learned models can include multi-headed self-attention models.

Machine-learned model(s) 1 can include a single or multiple instances of the same model configured to operate on data from input(s) 2. Machine-learned model(s) 1 can include an ensemble of different models that can cooperatively interact to process data from input(s) 2. For example, machine-learned model(s) 1 can employ a mixture-of-experts structure. See, e.g., Zhou et al., *Mixture-of-Experts with Expert Choice Routing*, ARXIV: 2202.09368v2 (Oct. 14, 2022).

Input(s) 2 can generally include or otherwise represent various types of data. Input(s) 2 can include one type or many different types of data. Output(s) 3 can be data of the same type(s) or of different types of data as compared to input(s) 2. Output(s) 3 can include one type or many different types of data.

Example data types for input(s) 2 or output(s) 3 include natural language text data, software code data (e.g., source code, object code, machine code, or any other form of computer-readable instructions or programming languages), machine code data (e.g., binary code, assembly code, or other forms of machine-readable instructions that can be executed directly by a computer's central processing unit), assembly code data (e.g., low-level programming languages that use symbolic representations of machine code instructions to program a processing unit), genetic data or other chemical or biochemical data, image data, audio data, audio-visual data, haptic data, biometric data, medical data, financial data, statistical data, geographical data, astronomical data, historical data, sensor data generally (e.g., digital or analog values, such as voltage or other absolute or relative level measurement values from a real or artificial input, such as from an audio sensor, light sensor, displacement sensor, etc.), and the like. Data can be raw or processed and can be in any format or schema.

In multimodal inputs 2 or outputs 3, example combinations of data types include image data and audio data, image data and natural language data, natural language data and software code data, image data and biometric data, sensor data and medical data, etc. It is to be understood that any combination of data types in an input 2 or an output 3 can be present.

An example input 2 can include one or multiple data types, such as the example data types noted above. An example output 3 can include one or multiple data types, such as the example data types noted above. The data type(s) of input 2 can be the same as or different from the data type(s) of output 3. It is to be understood that the example data types noted above are provided for illustrative purposes only. Data types contemplated within the scope of the present disclosure are not limited to those examples noted above.

Figure 12:
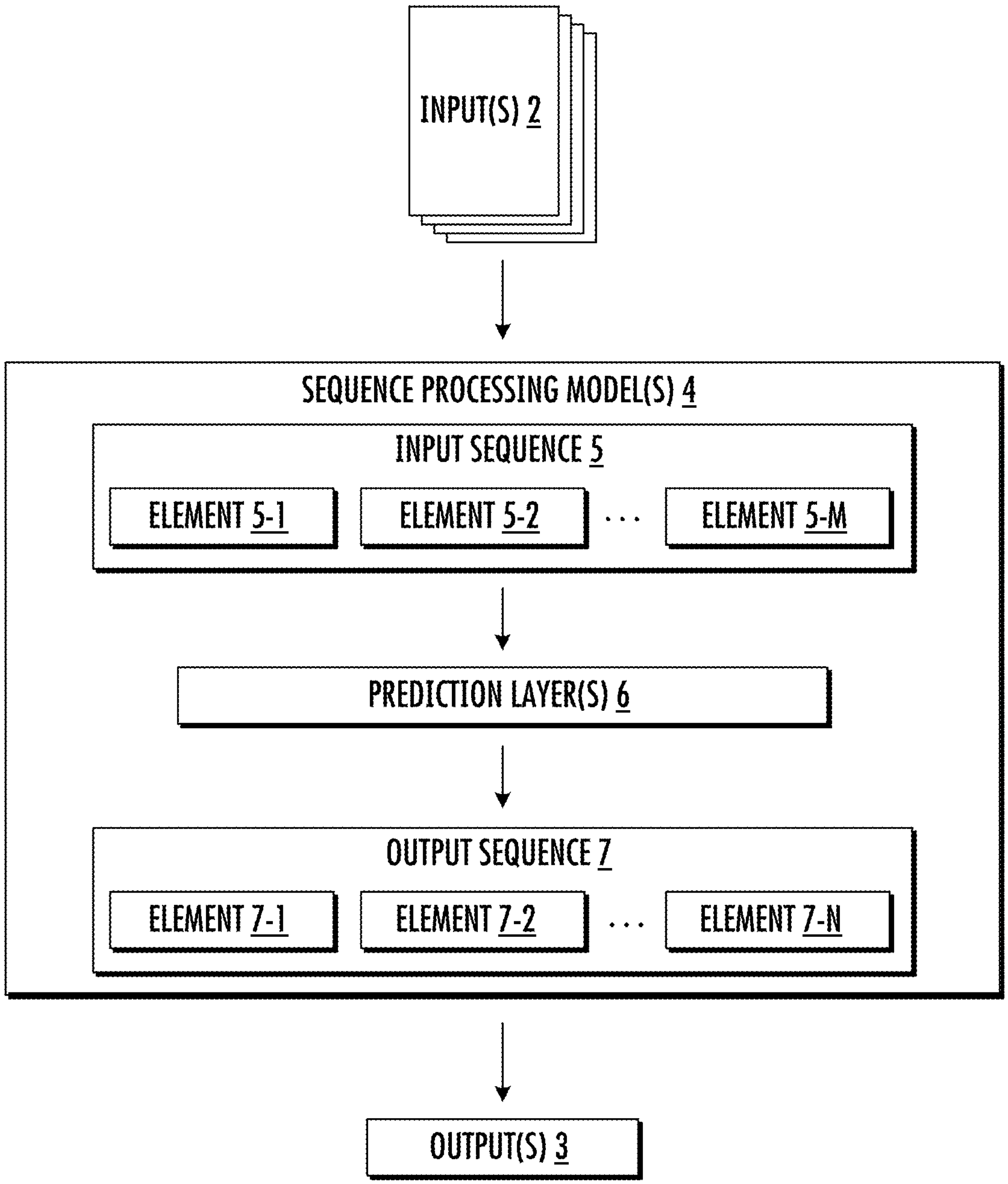
FIG. 12 depicts a block diagram of an example sequence processing model according to example implementations of aspects of the present disclosure.

FIG. 12 is a block diagram of an example implementation of an example machine-learned model configured to process sequences of information. For instance, an example implementation of machine-learned model(s) 1 can include machine-learned sequence processing model(s) 4. An example system can pass input(s) 2 to sequence processing model(s) 4. Sequence processing model(s) 4 can include one or more machine-learned components. Sequence processing model(s) 4 can process the data from input(s) 2 to obtain an input sequence 5. Input sequence 5 can include one or more input elements 5-1, 5-2, . . . , 5-M, etc. obtained from input(s) 2. Sequence processing model 4 can process input sequence 5 using prediction layer(s) 6 to generate an output sequence 7. Output sequence 7 can include one or more output elements 7-1, 7-2, . . . , 7-N, etc. generated based on input sequence 5. The system can generate output(s) 3 based on output sequence 7.

Sequence processing model(s) 4 can include one or multiple machine-learned model components configured to ingest, generate, or otherwise reason over sequences of information. For example, some example sequence processing models in the text domain are referred to as "Large Language Models," or LLMs. See, e.g., PaLM 2 Technical Report, GOOGLE, https://ai.google/static/documents/palm2techreport.pdf (n.d.). Other example sequence processing models can operate in other domains, such as image domains, see, e.g., Dosovitskiy et al., *An Image is Worth* 16×16 *Words: Transformers for Image Recognition at Scale,* arXiv: 2010.11929v2 (Jun. 3, 2021), audio domains, see, e.g., Agostinelli et al., *MusicLM: Generating Music From Text,* arXiv: 2301.11325v1 (Jan. 26, 2023), biochemical domains, see, e.g., Jumper et al., Highly accurate protein structure prediction with AlphaFold, 596 Nature 583 (Aug. 26, 2021), by way of example. Sequence processing model(s) 4 can process one or multiple types of data simultaneously. Sequence processing model(s) 4 can include relatively large models (e.g., more parameters, computationally expensive, etc.), relatively small models (e.g., fewer parameters, computationally lightweight, etc.), or both.

In general, sequence processing model(s) 4 can obtain input sequence 5 using data from input(s) 2. For instance, input sequence 5 can include a representation of data from input(s) 2 in a format understood by sequence processing model(s) 4. One or more machine-learned components of sequence processing model(s) 4 can ingest the data from input(s) 2, parse the data into pieces compatible with the processing architectures of sequence processing model(s) 4 (e.g., via "tokenization"), and project the pieces into an input space associated with prediction layer(s) 6 (e.g., via "embedding").

Sequence processing model(s) 4 can ingest the data from input(s) 2 and parse the data into a sequence of elements to obtain input sequence 5. For example, a portion of input data from input(s) 2 can be broken down into pieces that collectively represent the content of the portion of the input data. The pieces can provide the elements of the sequence.

Elements 5-1, 5-2, . . . , 5-M can represent, in some cases, building blocks for capturing or expressing meaningful information in a particular data domain. For instance, the elements can describe "atomic units" across one or more domains. For example, for textual input source(s), the elements can correspond to groups of one or more words or sub-word components, such as sets of one or more characters.

For example, elements 5-1, 5-2, . . . , 5-M can represent tokens obtained using a tokenizer. For instance, a tokenizer can process a given portion of an input source and output a series of tokens (e.g., corresponding to input elements 5-1, 5-2, . . . , 5-M) that represent the portion of the input source. Various approaches to tokenization can be used. For instance, textual input source(s) can be tokenized using a byte-pair encoding (BPE) technique. See, e.g., Kudo et al., *SentencePiece: A simple and language independent subword tokenizer and detokenizer for Neural Text Processing*, Proceedings of the 2018 Conference on Empirical Methods in Natural Language Processing (System Demonstrations), pages 66-71 (Oct. 31-Nov. 4, 2018), https://aclanthology.org/D18-2012.pdf. Image-based input source(s) can be tokenized by extracting and serializing patches from an image.

In general, arbitrary data types can be serialized and processed into input sequence 5. It is to be understood that element(s) 5-1, 5-2, . . . , 5-M depicted in FIG. 12 can be the tokens or can be the embedded representations thereof.

Prediction layer(s) 6 can predict one or more output elements 7-1, 7-2, . . . , 7-N based on the input elements. Prediction layer(s) 6 can include one or more machine-learned model architectures, such as one or more layers of learned parameters that manipulate and transform the input(s) to extract higher-order meaning from, and relationships between, input element(s) 5-1, 5-2, . . . , 5-M. In this manner, for instance, example prediction layer(s) 6 can predict new output element(s) in view of the context provided by input sequence 5.

Prediction layer(s) 6 can evaluate associations between portions of input sequence 5 and a particular output element. These associations can inform a prediction of the likelihood that a particular output follows the input context. For example, consider the textual snippet, "The carpenter's toolbox was small and heavy. It was full of __________." Example prediction layer(s) 6 can identify that "It" refers back to "toolbox" by determining a relationship between the respective embeddings. Example prediction layer(s) 6 can also link "It" to the attributes of the toolbox, such as "small" and "heavy." Based on these associations, prediction layer(s) 6 can, for instance, assign a higher probability to the word "nails" than to the word "sawdust."

A transformer is an example architecture that can be used in prediction layer(s) 4. See, e.g., Vaswani et al., *Attention Is All You Need,* arXiv: 1706.03762v7 (Aug. 2, 2023). A transformer is an example of a machine-learned model architecture that uses an attention mechanism to compute associations between items within a context window. The context window can include a sequence that contains input sequence 5 and potentially one or more output element(s) 7-1, 7-2, . . . , 7-N. A transformer block can include one or more attention layer(s) and one or more post-attention layer(s) (e.g., feedforward layer(s), such as a multi-layer perceptron).

Prediction layer(s) 6 can include other machine-learned model architectures in addition to or in lieu of transformer-based architectures. For example, recurrent neural networks (RNNs) and long short-term memory (LSTM) models can also be used, as well as convolutional neural networks (CNNs). In general, prediction layer(s) 6 can leverage various kinds of artificial neural networks that can understand or generate sequences of information.

Output sequence 7 can include or otherwise represent the same or different data types as input sequence 5. For instance, input sequence 5 can represent textual data, and output sequence 7 can represent textual data. Input sequence 5 can represent image, audio, or audiovisual data, and output sequence 7 can represent textual data (e.g., describing the image, audio, or audiovisual data). It is to be understood that prediction layer(s) 6, and any other interstitial model components of sequence processing model(s) 4, can be configured to receive a variety of data types in input sequence(s) 5 and output a variety of data types in output sequence(s) 7.

Output sequence 7 can have various relationships to input sequence 5. Output sequence 7 can be a continuation of input sequence 5. Output sequence 7 can be complementary to input sequence 5. Output sequence 7 can translate, transform, augment, or otherwise modify input sequence 5. Output sequence 7 can answer, evaluate, confirm, or otherwise respond to input sequence 5. Output sequence 7 can implement (or describe instructions for implementing) an instruction provided via input sequence 5.

Output sequence 7 can be generated autoregressively. For instance, for some applications, an output of one or more prediction layer(s) 6 can be passed through one or more output layers (e.g., softmax layer) to obtain a probability distribution over an output vocabulary (e.g., a textual or symbolic vocabulary) conditioned on a set of input elements in a context window. In this manner, for instance, output sequence 7 can be autoregressively generated by sampling a likely next output element, adding that element to the context window, and re-generating the probability distribution based on the updated context window, and sampling a likely next output element, and so forth.

Output sequence 7 can also be generated non-autoregressively. For instance, multiple output elements of output sequence 7 can be predicted together without explicit sequential conditioning on each other. See, e.g., Saharia et al., Non-Autoregressive Machine Translation with Latent Alignments, arXiv: 2004.07437v3 (Nov. 16, 2020).

Output sequence 7 can include one or multiple portions or elements. In an example content generation configuration, output sequence 7 can include multiple elements corresponding to multiple portions of a generated output sequence (e.g., a textual sentence, values of a discretized waveform, computer code, etc.). In an example classification configuration, output sequence 7 can include a single element associated with a classification output. For instance, an output "vocabulary" can include a set of classes into which an input sequence is to be classified. For instance, a vision transformer block can pass latent state information to a multilayer perceptron that outputs a likely class value associated with an input image.

Figure 13:
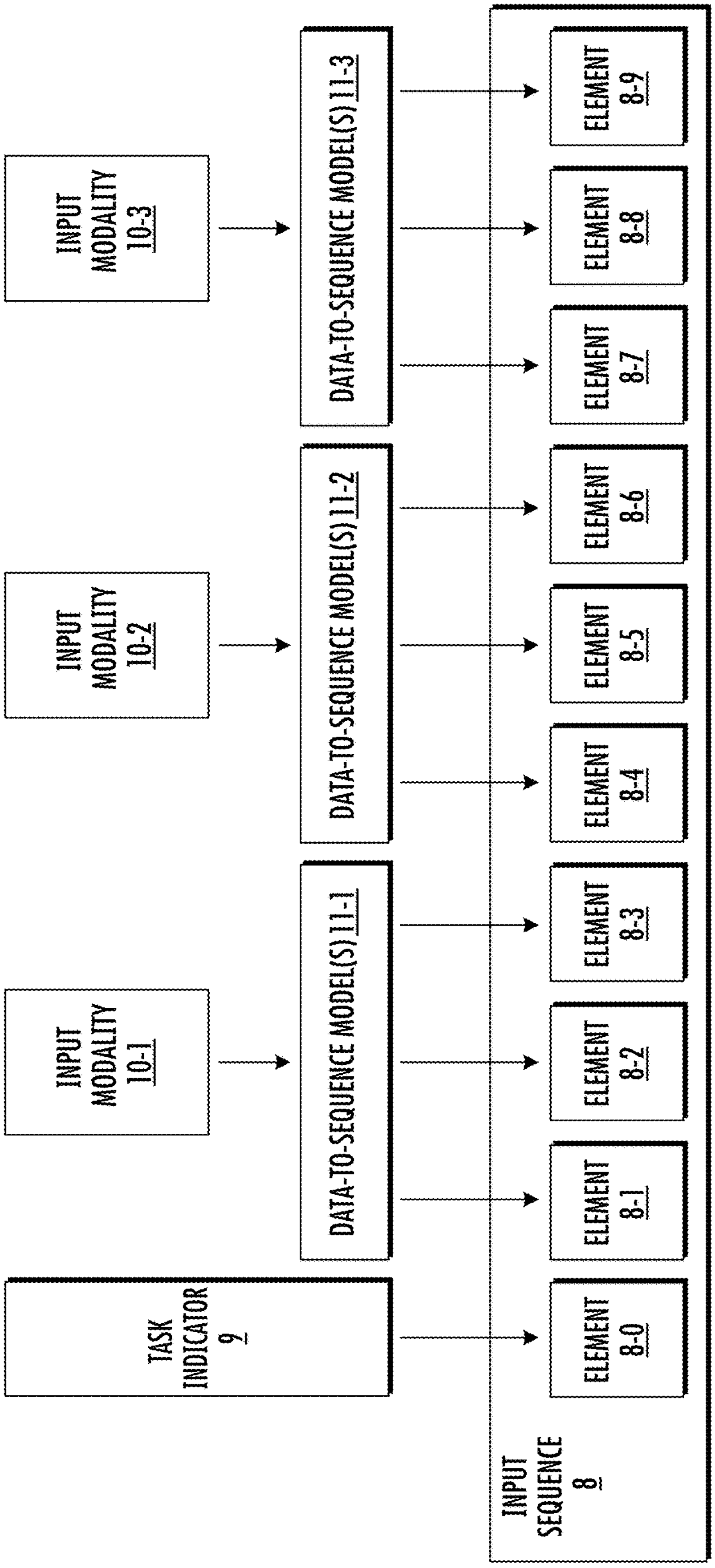
FIG. 13 depicts a block diagram of an example technique for populating an example input sequence for processing by a sequence processing model according to example implementations of aspects of the present disclosure.

FIG. 13 is a block diagram of an example technique for populating an example input sequence 8. Input sequence 8 can include various functional elements that form part of the model infrastructure, such as an element 8-0 obtained from a task indicator 9 that signals to any model(s) that process input sequence 8 that a particular task is being performed (e.g., to help adapt a performance of the model(s) to that particular task). Input sequence 8 can include various data elements from different data modalities. For instance, an input modality 10-1 can include one modality of data. A data-to-sequence model 11-1 can process data from input modality 10-1 to project the data into a format compatible with input sequence 8 (e.g., one or more vectors dimensioned according to the dimensions of input sequence 8) to obtain elements 8-1, 8-2, 8-3. Another input modality 10-2 can include a different modality of data. A data-to-sequence model 11-2 can project data from input modality 10-2 into a format compatible with input sequence 8 to obtain elements 8-4, 8-5, 8-6. Another input modality 10-3 can include yet another different modality of data. A data-to-sequence model 11-3 can project data from input modality 10-3 into a format compatible with input sequence 8 to obtain elements 8-7, 8-8, 8-9.

Input sequence 8 can be the same as or different from input sequence 5. Input sequence 8 can be a multimodal input sequence that contains elements that represent data from different modalities using a common dimensional representation. For instance, an embedding space can have P dimensions. Input sequence 8 can be configured to contain a plurality of elements that have P dimensions. In this manner, for instance, example implementations can facilitate information extraction and reasoning across diverse data modalities by projecting data into elements in the same embedding space for comparison, combination, or other computations therebetween.

For example, elements 8-0, . . . , 8-9 can indicate particular locations within a multidimensional embedding space. Some elements can map to a set of discrete locations in the embedding space. For instance, elements that correspond to discrete members of a predetermined vocabulary of tokens can map to discrete locations in the embedding space that are associated with those tokens. Other elements can be continuously distributed across the embedding space. For instance, some data types can be broken down into continuously defined portions (e.g., image patches) that can be described using continuously distributed locations within the embedding space.

In some implementations, the expressive power of the embedding space may not be limited to meanings associated with any particular set of tokens or other building blocks. For example, a continuous embedding space can encode a spectrum of high-order information. An individual piece of information (e.g., a token) can map to a particular point in that space: for instance, a token for the word "dog" can be projected to an embedded value that points to a particular location in the embedding space associated with canine-related information. Similarly, an image patch of an image of a dog on grass can also be projected into the embedding space. In some implementations, the projection of the image of the dog can be similar to the projection of the word "dog" while also having similarity to a projection of the word "grass," while potentially being different from both. In some implementations, the projection of the image patch may not exactly align with any single projection of a single word. In some implementations, the projection of the image patch can align with a combination of the projections of the words "dog" and "grass." In this manner, for instance, a high-order embedding space can encode information that can be independent of data modalities in which the information is expressed.

Task indicator 9 can include a model or model component configured to identify a task being performed and inject, into input sequence 8, an input value represented by element 8-0 that signals which task is being performed. For instance, the input value can be provided as a data type associated with an input modality and projected along with that input modality (e.g., the input value can be a textual task label that is embedded along with other textual data in the input; the input value can be a pixel-based representation of a task that is embedded along with other image data in the input; etc.). The input value can be provided as a data type that differs from or is at least independent from other input(s). For instance, the input value represented by element 8-0 can be a learned embedding within a continuous embedding space.

Input modalities 10-1, 10-2, and 10-3 can be associated with various different data types (e.g., as described above with respect to input(s) 2 and output(s) 3).

Data-to-sequence models 11-1, 11-2, and 11-3 can be the same or different from each other. Data-to-sequence models 11-1, 11-2, and 11-3 can be adapted to each respective input modality 10-1, 10-2, and 10-3. For example, a textual data-to-sequence model can subdivide a portion of input text and project the subdivisions into element(s) in input sequence 8 (e.g., elements 8-1, 8-2, 8-3, etc.). An image data-to-sequence model can subdivide an input image and project the subdivisions into element(s) in input sequence 8 (e.g., elements 8-4, 8-5, 8-6, etc.). An arbitrary datatype data-to-sequence model can subdivide an input of that arbitrary datatype and project the subdivisions into element(s) in input sequence 8 (e.g., elements 8-7, 8-8, 8-9, etc.).

Data-to-sequence models 11-1, 11-2, and 11-3 can form part of machine-learned sequence processing model(s) 4. Data-to-sequence models 11-1, 11-2, and 11-3 can be jointly trained with or trained independently from machine-learned sequence processing model(s) 4. Data-to-sequence models 11-1, 11-2, and 11-3 can be trained end-to-end with machine-learned sequence processing model(s) 4.

Figure 14:
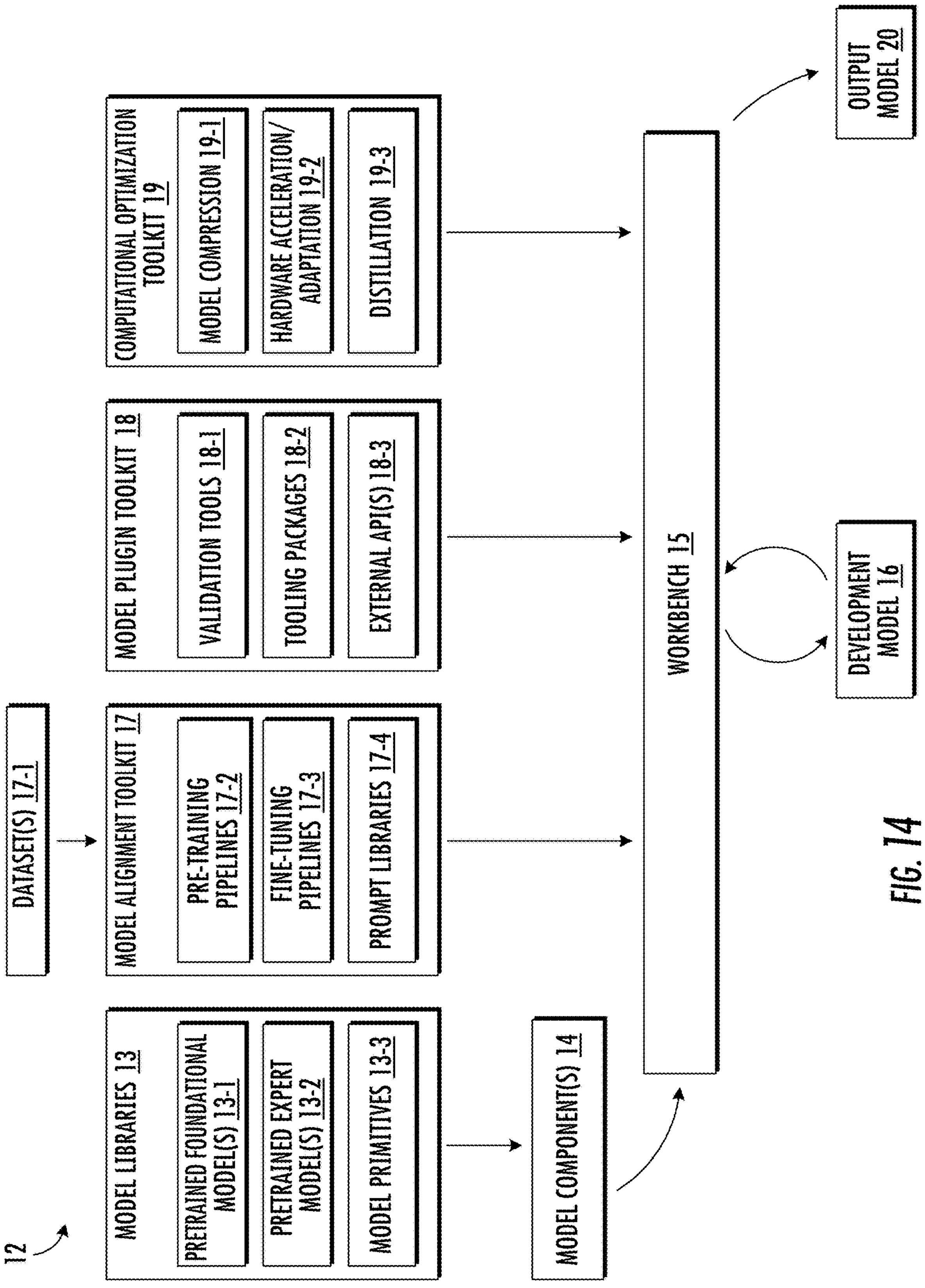
FIG. 14 depicts a block diagram of an example model development platform according to example implementations of aspects of the present disclosure.

FIG. 14 is a block diagram of an example model development platform 12 that can facilitate creation, adaptation, and refinement of example machine-learned models (e.g., machine-learned model(s) 1, sequence processing model(s) 4, etc.). Model development platform 12 can provide a number of different toolkits that developer systems can employ in the development of new or adapted machine-learned models.

Model development platform 12 can provide one or more model libraries 13 containing building blocks for new models. Model libraries 13 can include one or more pre-trained foundational models 13-1, which can provide a backbone of processing power across various tasks. Model libraries 13 can include one or more pre-trained expert models 13-2, which can be focused on performance in particular domains of expertise. Model libraries 13 can include various model primitives 13-3, which can provide low-level architectures or components (optionally pre-trained), which can be assembled in various arrangements as desired.

Model development platform 12 can receive selections of various model components 14. Model development platform 12 can pass selected model components 14 to a workbench 15 that combines selected model components 14 into a development model 16.

Workbench 15 can facilitate further refinement and adaptation of development model 16 by leveraging a number of different toolkits integrated with model development platform 12. For example, workbench 15 can facilitate alignment of the development model 16 with a desired performance profile on various tasks using a model alignment toolkit 17.

Model alignment toolkit 17 can provide a number of tools for causing development model 16 to generate outputs aligned with desired behavioral characteristics. Alignment can include increasing an accuracy, precision, recall, etc. of model outputs. Alignment can include enforcing output styles, schema, or other preferential characteristics of model outputs. Alignment can be general or domain-specific. For instance, a pre-trained foundational model 13-1 can begin with an initial level of performance across multiple domains. Alignment of the pre-trained foundational model 13-1 can include improving a performance in a particular domain of information or tasks (e.g., even at the expense of performance in another domain of information or tasks).

Model alignment toolkit 17 can integrate one or more dataset(s) 17-1 for aligning development model 16. Curated dataset(s) 17-1 can include labeled or unlabeled training data. Dataset(s) 17-1 can be obtained from public domain datasets. Dataset(s) 17-1 can be obtained from private datasets associated with one or more developer system(s) for the alignment of bespoke machine-learned model(s) customized for private use-cases.

Pre-training pipelines 17-2 can include a machine-learned model training workflow configured to update development model 16 over large-scale, potentially noisy datasets. For example, pre-training can leverage unsupervised learning techniques (e.g., de-noising, etc.) to process large numbers of training instances to update model parameters from an initialized state and achieve a desired baseline performance. Pre-training pipelines 17-2 can leverage unlabeled datasets in dataset(s) 17-1 to perform pre-training. Workbench 15 can implement a pre-training pipeline 17-2 to pre-train development model 16.

Fine-tuning pipelines 17-3 can include a machine-learned model training workflow configured to refine the model parameters of development model 16 with higher-quality data. Fine-tuning pipelines 17-3 can update development model 16 by conducting supervised training with labeled dataset(s) in dataset(s) 17-1. Fine-tuning pipelines 17-3 can update development model 16 by conducting reinforcement learning using reward signals from user feedback signals. Workbench 15 can implement a fine-tuning pipeline 17-3 to fine-tune development model 16.

Prompt libraries 17-4 can include sets of inputs configured to induce behavior aligned with desired performance criteria. Prompt libraries 17-4 can include few-shot prompts (e.g., inputs providing examples of desired model outputs for prepending to a desired runtime query), chain-of-thought prompts (e.g., inputs providing step-by-step reasoning within the exemplars to facilitate thorough reasoning by the model), and the like.

Example prompts can be retrieved from an available repository of prompt libraries 17-4. Example prompts can be contributed by one or more developer systems using workbench 15.

In some implementations, pre-trained or fine-tuned models can achieve satisfactory performance without exemplars in the inputs. For instance, zero-shot prompts can include inputs that lack exemplars. Zero-shot prompts can be within a domain within a training dataset or outside of the training domain(s).

Prompt libraries 17-4 can include one or more prompt engineering tools. Prompt engineering tools can provide workflows for retrieving or learning optimized prompt values. Prompt engineering tools can facilitate directly learning prompt values (e.g., input element values) based on one or more training iterations. Workbench 15 can implement prompt engineering tools in development model 16.

Prompt libraries 17-4 can include pipelines for prompt generation. For example, inputs can be generated using development model 16 itself or other machine-learned models. In this manner, for instance, a first model can process information about a task and output an input for a second model to process in order to perform a step of the task. The second model can be the same as or different from the first model. Workbench 15 can implement prompt generation pipelines in development model 16.

Prompt libraries 17-4 can include pipelines for context injection. For instance, a performance of development model 16 on a particular task can improve if provided with additional context for performing the task. Prompt libraries 17-4 can include software components configured to identify desired context, retrieve the context from an external source (e.g., a database, a sensor, etc.), and add the context to the input prompt. Workbench 15 can implement context injection pipelines in development model 16.

Although various training examples described herein with respect to model development platform 12 refer to "pre-training" and "fine-tuning," it is to be understood that model alignment toolkit 17 can generally support a wide variety of training techniques adapted for training a wide variety of machine-learned models. Example training techniques can correspond to the example training method 1000 described above.

Model development platform 12 can include a model plugin toolkit 18. Model plugin toolkit 18 can include a variety of tools configured for augmenting the functionality of a machine-learned model by integrating the machine-learned model with other systems, devices, and software components. For instance, a machine-learned model can use tools to increase performance quality where appropriate. For instance, deterministic tasks can be offloaded to dedicated tools in lieu of probabilistically performing the task with an increased risk of error. For instance, instead of autoregressively predicting the solution to a system of equations, a machine-learned model can recognize a tool to call for obtaining the solution and pass the system of equations to the appropriate tool. The tool can be a traditional system of equations solver that can operate deterministically to resolve the system of equations. The output of the tool can be returned in response to the original query. In this manner, tool use can allow some example models to focus on the strengths of machine-learned models—e.g., understanding an intent in an unstructured request for a task—while augmenting the performance of the model by offloading certain tasks to a more focused tool for rote application of deterministic algorithms to a well-defined problem.

Model plugin toolkit 18 can include validation tools 18-1. Validation tools 18-1 can include tools that can parse and confirm output(s) of a machine-learned model. Validation tools 18-1 can include engineered heuristics that establish certain thresholds applied to model outputs. For example, validation tools 18-1 can ground the outputs of machine-learned models to structured data sources (e.g., to mitigate "hallucinations").

Model plugin toolkit 18 can include tooling packages 18-2 for implementing one or more tools that can include scripts or other executable code that can be executed alongside development model 16. Tooling packages 18-2 can include one or more inputs configured to cause machine-learned model(s) to implement the tools (e.g., few-shot prompts that induce a model to output tool calls in the proper syntax, etc.). Tooling packages 18-2 can include, for instance, fine-tuning training data for training a model to use a tool.

Model plugin toolkit 18 can include interfaces for calling external application programming interfaces (APIs) 18-3. For instance, in addition to or in lieu of implementing tool calls or tool code directly with development model 16, development model 16 can be aligned to output instructions that initiate API calls to send or obtain data via external systems.

Model plugin toolkit 18 can integrate with prompt libraries 17-4 to build a catalog of available tools for use with development model 16. For instance, a model can receive, in an input, a catalog of available tools, and the model can generate an output that selects a tool from the available tools and initiates a tool call for using the tool.

Model development platform 12 can include a computational optimization toolkit 19 for optimizing a computational performance of development model 16. For instance, tools for model compression 19-1 can allow development model 16 to be reduced in size while maintaining a desired level of performance. For instance, model compression 19-1 can include quantization workflows, weight pruning and sparsification techniques, etc. Tools for hardware acceleration 19-2 can facilitate the configuration of the model storage and execution formats to operate optimally on different hardware resources. For instance, hardware acceleration 19-2 can include tools for optimally sharding models for distributed processing over multiple processing units for increased bandwidth, lower unified memory requirements, etc. Tools for distillation 19-3 can provide for the training of lighter-weight models based on the knowledge encoded in development model 16. For instance, development model 16 can be a highly performant, large machine-learned model optimized using model development platform 12. To obtain a lightweight model for running in resource-constrained environments, a smaller model can be a "student model" that learns to imitate development model 16 as a "teacher model." In this manner, for instance, the investment in learning the parameters and configurations of development model 16 can be efficiently transferred to a smaller model for more efficient inference.

Workbench 15 can implement one, multiple, or none of the toolkits implemented in model development platform 12. Workbench 15 can output an output model 20 based on development model 16. Output model 20 can be a deployment version of development model 16. Output model 20 can be a development or training checkpoint of development model 16. Output model 20 can be a distilled, compressed, or otherwise optimized version of development model 16.

Figure 15:
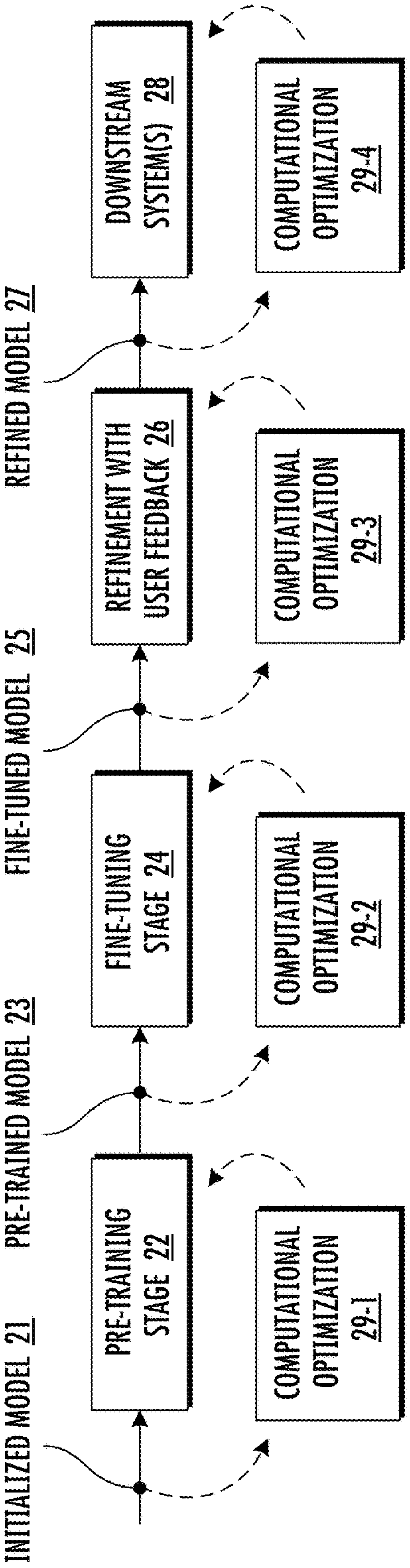
FIG. 15 depicts a block diagram of an example training workflow for training a machine-learned model according to example implementations of aspects of the present disclosure.

FIG. 15 is a block diagram of an example training flow for training a machine-learned development model 16. One or more portion(s) of the example training flow can be implemented by a computing system that includes one or more computing devices such as, for example, computing systems described with reference to the other figures. Each respective portion of the example training flow can be performed by any (or any combination) of one or more computing devices. Moreover, one or more portion(s) of the example training flow can be implemented on the hardware components of the device(s) described herein, for example, to train one or more systems or models. FIG. 15 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 15 is described with reference to elements/terms described with respect to other systems and figures for exemplary illustrated purposes and is not meant to be limiting. One or more portions of the example training flow can be performed additionally, or alternatively, by other systems.

Initially, development model 16 can persist in an initial state as an initialized model 21. Development model 16 can be initialized with weight values. Initial weight values can be random or based on an initialization schema. Initial weight values can be based on prior pre-training for the same or for a different model.

Initialized model 21 can undergo pre-training in a pre-training stage 22. Pre-training stage 22 can be implemented using one or more pre-training pipelines 17-2 over data from dataset(s) 17-1. Pre-training can be omitted, for example, if initialized model 21 is already pre-trained (e.g., development model 16 contains, is, or is based on a pre-trained foundational model or an expert model).

Pre-trained model 23 can then be a new version of development model 16, which can persist as development model 16 or as a new development model. Pre-trained model 23 can be the initial state if development model 16 was already pre-trained. Pre-trained model 23 can undergo fine-tuning in a fine-tuning stage 24. Fine-tuning stage 24 can be implemented using one or more fine-tuning pipelines 17-3 over data from dataset(s) 17-1. Fine-tuning can be omitted, for example, if a pre-trained model has satisfactory performance, if the model was already fine-tuned, or if other tuning approaches are preferred.

Fine-tuned model 29 can then be a new version of development model 16, which can persist as development model 16 or as a new development model. Fine-tuned model 29 can be the initial state if development model 16 was already fine-tuned. Fine-tuned model 29 can undergo refinement with user feedback 26. For instance, refinement with user feedback 26 can include reinforcement learning, optionally based on human feedback from human users of fine-tuned model 25. As reinforcement learning can be a form of fine-tuning, it is to be understood that fine-tuning stage 24 can subsume the stage for refining with user feedback 26. Refinement with user feedback 26 can produce a refined model 27. Refined model 27 can be output to downstream system(s) 28 for deployment or further development.

In some implementations, computational optimization operations can be applied before, during, or after each stage. For instance, initialized model 21 can undergo computational optimization 29-1 (e.g., using computational optimization toolkit 19) before pre-training stage 22. Pre-trained model 23 can undergo computational optimization 29-2 (e.g., using computational optimization toolkit 19) before fine-tuning stage 24. Fine-tuned model 25 can undergo computational optimization 29-3 (e.g., using computational optimization toolkit 19) before refinement with user feedback 26. Refined model 27 can undergo computational optimization 29-4 (e.g., using computational optimization toolkit 19) before output to downstream system(s) 28. Computational optimization(s) 29-1, . . . , 29-4 can all be the same, all be different, or include at least some different optimization techniques.

Figure 16:
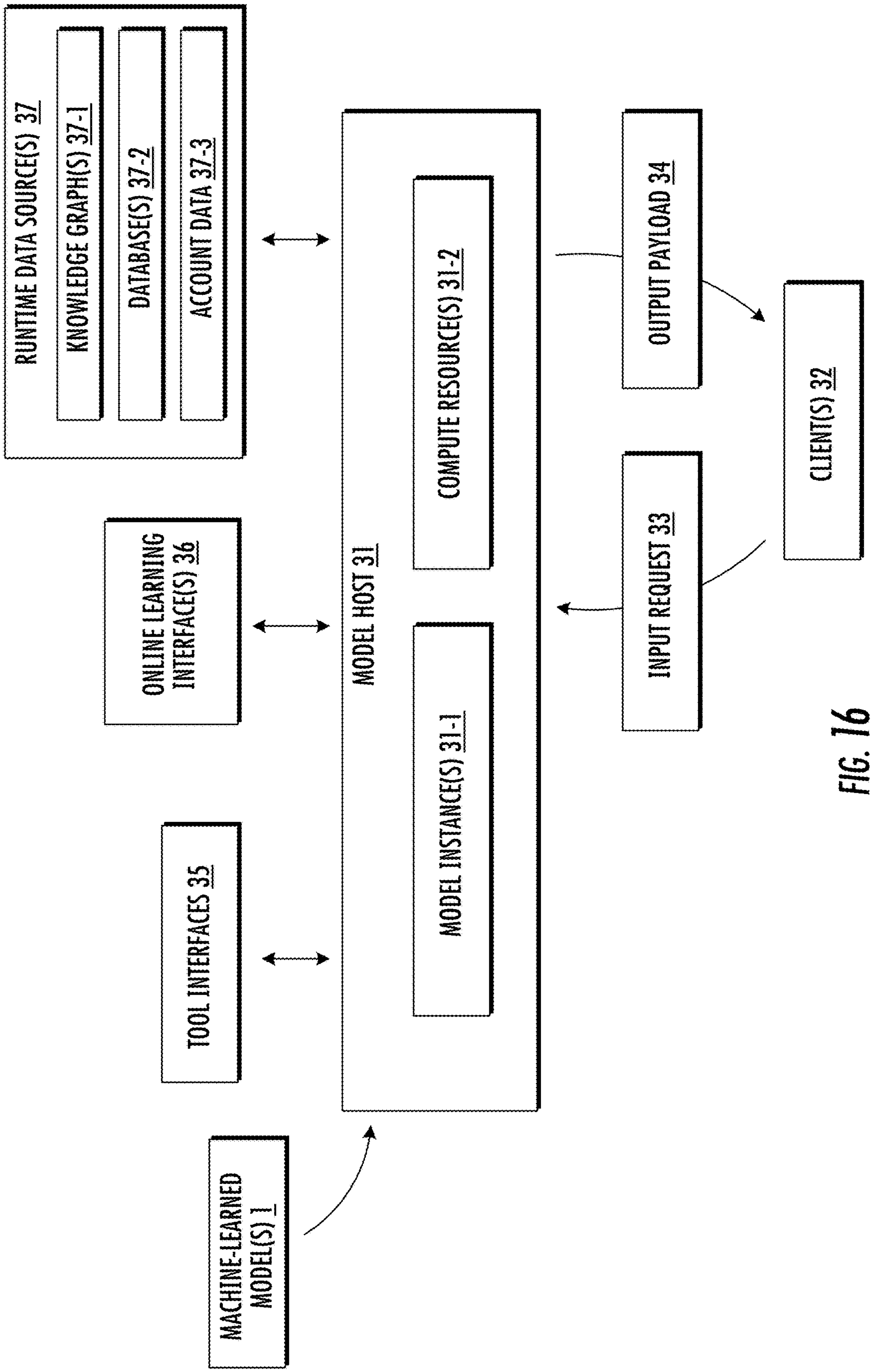
FIG. 16 depicts a block diagram of an inference system for operating one or more machine-learned model(s) to perform inference according to example implementations of aspects of the present disclosure.

FIG. 16 is a block diagram of an inference system for operating one or more machine-learned model(s) 1 to perform inference (e.g., for training, for deployment, etc.). A model host 31 can receive machine-learned model(s) 1. Model host 31 can host one or more model instance(s) 31-1, which can be one or multiple instances of one or multiple models. Model host 31 can host model instance(s) 31-1 using available compute resources 31-2 associated with model host 31.

Model host 31 can perform inference on behalf of one or more client(s) 32. Client(s) 32 can transmit an input request 33 to model host 31. Using input request 33, model host 31 can obtain input(s) 2 for input to machine-learned model(s) 1. Machine-learned model(s) 1 can process input(s) 2 to generate output(s) 3. Using output(s) 3, model host 31 can return an output payload 34 for responding to input request 33 from client(s) 32. Output payload 34 can include or be based on output(s) 3.

Model host 31 can leverage various other resources and tools to augment the inference task. For instance, model host 31 can communicate with tool interfaces 35 to facilitate tool use by model instance(s) 31-1. Tool interfaces 35 can include local or remote APIs. Tool interfaces 35 can include integrated scripts or other software functionality. Model host 31 can engage online learning interface(s) 36 to facilitate ongoing improvements to machine-learned model(s) 1. For instance, online learning interface(s) 36 can be used within reinforcement learning loops to retrieve user feedback on inferences served by model host 31. Model host 31 can access runtime data source(s) 37 for augmenting input(s) 2 with additional contextual information. For instance, runtime data source(s) 37 can include a knowledge graph 37-1 that facilitates structured information retrieval for information associated with input request(s) 33 (e.g., a search engine service). Runtime data source(s) 37 can include public or private, external or local database(s) 37-2 that can store information associated with input request(s) 33 for augmenting input(s) 2. Runtime data source(s) 37 can include account data 37-3 which can be retrieved in association with a user account corresponding to a client 32 for customizing the behavior of model host 31 accordingly.

Model host 31 can be implemented by one or multiple computing devices or systems. Client(s) 2 can be implemented by one or multiple computing devices or systems, which can include computing devices or systems shared with model host 31.

For example, model host 31 can operate on a server system that provides a machine-learning service to client device(s) that operate client(s) 32 (e.g., over a local or wide-area network). Client device(s) can be end-user devices used by individuals. Client device(s) can be server systems that operate client(s) 32 to provide various functionality as a service to downstream end-user devices.

In some implementations, model host 31 can operate on a same device or system as client(s) 32. Model host 31 can be a machine-learning service that runs on-device to provide machine-learning functionality to one or multiple applications operating on a client device, which can include an application implementing client(s) 32. Model host 31 can be a part of a same application as client(s) 32. For instance, model host 31 can be a subroutine or method implemented by one part of an application, and client(s) 32 can be another subroutine or method that engages model host 31 to perform inference functions within the application. It is to be understood that model host 31 and client(s) 32 can have various different configurations.

Model instance(s) 31-1 can include one or more machine-learned models that are available for performing inference. Model instance(s) 31-1 can include weights or other model components that are stored in persistent storage, temporarily cached, or loaded into high-speed memory. Model instance(s) 31-1 can include multiple instance(s) of the same model (e.g., for parallel execution of more requests on the same model). Model instance(s) 31-1 can include instance(s) of different model(s). Model instance(s) 31-1 can include cached intermediate states of active or inactive model(s) used to accelerate inference of those models. For instance, an inference session with a particular model may generate significant amounts of computational results that can be re-used for future inference runs (e.g., using a KV cache for transformer-based models). These computational results can be saved in association with that inference session so that session can be executed more efficiently when resumed.

Compute resource(s) 31-2 can include one or more processors (central processing units, graphical processing units, tensor processing units, machine-learning accelerators, etc.) connected to one or more memory devices. Compute resource(s) 31-2 can include a dynamic pool of available resources shared with other processes. Compute resource(s) 31-2 can include memory devices large enough to fit an entire model instance in a single memory instance. Compute resource(s) 31-2 can also share model instance(s) across multiple memory devices (e.g., using data parallelization or tensor parallelization, etc.). This can be done to increase parallelization or to execute a large model using multiple memory devices which individually might not be able to fit the entire model into memory.

Input request 33 can include data for input(s) 2. Model host 31 can process input request 33 to obtain input(s) 2. Input(s) 2 can be obtained directly from input request 33 or can be retrieved using input request 33. Input request 33 can be submitted to model host 31 via an API.

Model host 31 can perform inference over batches of input requests 33 in parallel. For instance, a model instance 31-1 can be configured with an input structure that has a batch dimension. Separate input(s) 2 can be distributed across the batch dimension (e.g., rows of an array). The separate input(s) 2 can include completely different contexts. The separate input(s) 2 can be multiple inference steps of the same task. The separate input(s) 2 can be staggered in an input structure, such that any given inference cycle can be operating on different portions of the respective input(s) 2. In this manner, for instance, model host 31 can perform inference on the batch in parallel, such that output(s) 3 can also contain the batch dimension and return the inference results for the batched input(s) 2 in parallel. In this manner, for instance, batches of input request(s) 33 can be processed in parallel for higher throughput of output payload(s) 34.

Output payload 34 can include or be based on output(s) 3 from machine-learned model(s) 1. Model host 31 can process output(s) 3 to obtain output payload 34. This can include chaining multiple rounds of inference (e.g., iteratively, recursively, across the same model(s) or different model(s)) to arrive at a final output for a task to be returned in output payload 34. Output payload 34 can be transmitted to client(s) 32 via an API.

Online learning interface(s) 36 can facilitate reinforcement learning of machine-learned model(s) 1. Online learning interface(s) 36 can facilitate reinforcement learning with human feedback (RLHF). Online learning interface(s) 36 can facilitate federated learning of machine-learned model(s) 1.

Model host 31 can execute machine-learned model(s) 1 to perform inference for various tasks using various types of data. For example, various different input(s) 2 and output(s) 3 can be used for various different tasks. In some implementations, input(s) 2 can be or otherwise represent image data. Machine-learned model(s) 1 can process the image data to generate an output. As an example, machine-learned model(s) 1 can process the image data to generate an image recognition output (e.g., a recognition of the image data, a latent embedding of the image data, an encoded representation of the image data, a hash of the image data, etc.). As another example, machine-learned model(s) 1 can process the image data to generate an image segmentation output. As another example, machine-learned model(s) 1 can process the image data to generate an image classification output. As another example, machine-learned model(s) 1 can process the image data to generate an image data modification output (e.g., an alteration of the image data, etc.). As another example, machine-learned model(s) 1 can process the image data to generate an encoded image data output (e.g., an encoded and/or compressed representation of the image data, etc.). As another example, machine-learned model(s) 1 can process the image data to generate an upscaled image data output. As another example, machine-learned model(s) 1 can process the image data to generate a prediction output.

In some implementations, the task is a computer vision task. In some cases, input(s) 2 includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some implementations, input(s) 2 can be or otherwise represent natural language data. Machine-learned model(s) 1 can process the natural language data to generate an output. As an example, machine-learned model(s) 1 can process the natural language data to generate a language encoding output. As another example, machine-learned model(s) 1 can process the natural language data to generate a latent text embedding output. As another example, machine-learned model(s) 1 can process the natural language data to generate a translation output. As another example, machine-learned model(s) 1 can process the natural language data to generate a classification output. As another example, machine-learned model(s) 1 can process the natural language data to generate a textual segmentation output. As another example, machine-learned model(s) 1 can process the natural language data to generate a semantic intent output. As another example, machine-learned model(s) 1 can process the natural language data to generate an upscaled text or natural language output (e.g., text or natural language data that is higher quality than the input text or natural language, etc.). As another example, machine-learned model(s) 1 can process the natural language data to generate a prediction output (e.g., one or more predicted next portions of natural language content).

In some implementations, input(s) 2 can be or otherwise represent speech data (e.g., data describing spoken natural language, such as audio data, textual data, etc.). Machine-learned model(s) 1 can process the speech data to generate an output. As an example, machine-learned model(s) 1 can process the speech data to generate a speech recognition output. As another example, machine-learned model(s) 1 can process the speech data to generate a speech translation output. As another example, machine-learned model(s) 1 can process the speech data to generate a latent embedding output. As another example, machine-learned model(s) 1 can process the speech data to generate an encoded speech output (e.g., an encoded and/or compressed representation of the speech data, etc.). As another example, machine-learned model(s) 1 can process the speech data to generate an upscaled speech output (e.g., speech data that is higher quality than the input speech data, etc.). As another example, machine-learned model(s) 1 can process the speech data to generate a textual representation output (e.g., a textual representation of the input speech data, etc.). As another example, machine-learned model(s) 1 can process the speech data to generate a prediction output.

In some implementations, input(s) 2 can be or otherwise represent latent encoding data (e.g., a latent space representation of an input, etc.). Machine-learned model(s) 1 can process the latent encoding data to generate an output. As an example, machine-learned model(s) 1 can process the latent encoding data to generate a recognition output. As another example, machine-learned model(s) 1 can process the latent encoding data to generate a reconstruction output. As another example, machine-learned model(s) 1 can process the latent encoding data to generate a search output. As another example, machine-learned model(s) 1 can process the latent encoding data to generate a reclustering output. As another example, machine-learned model(s) 1 can process the latent encoding data to generate a prediction output.

In some implementations, input(s) 2 can be or otherwise represent statistical data. Statistical data can be, represent, or otherwise include data computed and/or calculated from some other data source. Machine-learned model(s) 1 can process the statistical data to generate an output. As an example, machine-learned model(s) 1 can process the statistical data to generate a recognition output. As another example, machine-learned model(s) 1 can process the statistical data to generate a prediction output. As another example, machine-learned model(s) 1 can process the statistical data to generate a classification output. As another example, machine-learned model(s) 1 can process the statistical data to generate a segmentation output. As another example, machine-learned model(s) 1 can process the statistical data to generate a visualization output. As another example, machine-learned model(s) 1 can process the statistical data to generate a diagnostic output.

In some implementations, input(s) 2 can be or otherwise represent sensor data. Machine-learned model(s) 1 can process the sensor data to generate an output. As an example, machine-learned model(s) 1 can process the sensor data to generate a recognition output. As another example, machine-learned model(s) 1 can process the sensor data to generate a prediction output. As another example, machine-learned model(s) 1 can process the sensor data to generate a classification output. As another example, machine-learned model(s) 1 can process the sensor data to generate a segmentation output. As another example, machine-learned model(s) 1 can process the sensor data to generate a visualization output. As another example, machine-learned model(s) 1 can process the sensor data to generate a diagnostic output. As another example, machine-learned model(s) 1 can process the sensor data to generate a detection output.

In some implementations, machine-learned model(s) 1 can be configured to perform a task that includes encoding input data for reliable and/or efficient transmission or storage (and/or corresponding decoding). For example, the task may be an audio compression task. The input may include audio data and the output may comprise compressed audio data. In another example, the input includes visual data (e.g. one or more images or videos), the output comprises compressed visual data, and the task is a visual data compression task. In another example, the task may comprise generating an embedding for input data (e.g. input audio or visual data). In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

In some implementations, the task is a generative task, and machine-learned model(s) 1 can be configured to output content generated in view of input(s) 2. For instance, input(s) 2 can be or otherwise represent data of one or more modalities that encodes context for generating additional content.

In some implementations, the task can be a text completion task. Machine-learned model(s) 1 can be configured to process input(s) 2 that represent textual data and to generate output(s) 3 that represent additional textual data that completes a textual sequence that includes input(s) 2. For instance, machine-learned model(s) 1 can be configured to generate output(s) 3 to complete a sentence, paragraph, or portion of text that follows from a portion of text represented by input(s) 2.

In some implementations, the task can be an instruction following task. Machine-learned model(s) 1 can be configured to process input(s) 2 that represent instructions to perform a function and to generate output(s) 3 that advance a goal of satisfying the instruction function (e.g., at least a step of a multi-step procedure to perform the function). Output(s) 3 can represent data of the same or of a different modality as input(s) 2. For instance, input(s) 2 can represent textual data (e.g., natural language instructions for a task to be performed) and machine-learned model(s) 1 can process input(s) 2 to generate output(s) 3 that represent textual data responsive to the instructions (e.g., natural language responses, programming language responses, machine language responses, etc.). Input(s) 2 can represent image data (e.g., image-based instructions for a task to be performed, optionally accompanied by textual instructions) and machine-learned model(s) 1 can process input(s) 2 to generate output(s) 3 that represent textual data responsive to the instructions (e.g., natural language responses, programming language responses, machine language responses, etc.). One or more output(s) 3 can be iteratively or recursively generated to sequentially process and accomplish steps toward accomplishing the requested functionality. For instance, an initial output can be executed by an external system or be processed by machine-learned model(s) 1 to complete an initial step of performing a function. Multiple steps can be performed, with a final output being obtained that is responsive to the initial instructions.

In some implementations, the task can be a question answering task. Machine-learned model(s) 1 can be configured to process input(s) 2 that represent a question to answer and to generate output(s) 3 that advance a goal of returning an answer to the question (e.g., at least a step of a multi-step procedure to perform the function). Output(s) 3 can represent data of the same or of a different modality as input(s) 2. For instance, input(s) 2 can represent textual data (e.g., natural language instructions for a task to be performed) and machine-learned model(s) 1 can process input(s) 2 to generate output(s) 3 that represent textual data responsive to the question (e.g., natural language responses, programming language responses, machine language responses, etc.). Input(s) 2 can represent image data (e.g., image-based instructions for a task to be performed, optionally accompanied by textual instructions) and machine-learned model(s) 1 can process input(s) 2 to generate output(s) 3 that represent textual data responsive to the question (e.g., natural language responses, programming language responses, machine language responses, etc.). One or more output(s) 3 can be iteratively or recursively generated to sequentially process and accomplish steps toward answering the question. For instance, an initial output can be executed by an external system or be processed by machine-learned model(s) 1 to complete an initial step of obtaining an answer to the question (e.g., querying a database, performing a computation, executing a script, etc.). Multiple steps can be performed, with a final output being obtained that is responsive to the question.

In some implementations, the task can be an image generation task. Machine-learned model(s) 1 can be configured to process input(s) 2 that represent context regarding a desired portion of image content. The context can include text data, image data, audio data, etc. Machine-learned model(s) 1 can be configured to generate output(s) 3 that represent image data that depicts imagery related to the context. For instance, machine-learned model(s) 1 can be configured to generate pixel data of an image. Values for channel(s) associated with the pixels in the pixel data can be selected based on the context (e.g., based on a probability determined based on the context).

In some implementations, the task can be an audio generation task. Machine-learned model(s) 1 can be configured to process input(s) 2 that represent context regarding a desired portion of audio content. The context can include text data, image data, audio data, etc. Machine-learned model(s) 1 can be configured to generate output(s) 3 that represent audio data related to the context. For instance, machine-learned model(s) 1 can be configured to generate waveform data in the form of an image (e.g., a spectrogram). Values for channel(s) associated with pixels of the image can be selected based on the context. Machine-learned model(s) 1 can be configured to generate waveform data in the form of a sequence of discrete samples of a continuous waveform. Values of the sequence can be selected based on the context (e.g., based on a probability determined based on the context).

In some implementations, the task can be a data generation task. Machine-learned model(s) 1 can be configured to process input(s) 2 that represent context regarding a desired portion of data (e.g., data from various data domains, such as sensor data, image data, multimodal data, statistical data, etc.). The desired data can be, for instance, synthetic data for training other machine-learned models. The context can include arbitrary data type(s). Machine-learned model(s) 1 can be configured to generate output(s) 3 that represent data that aligns with the desired data. For instance, machine-learned model(s) 1 can be configured to generate data values for populating a dataset. Values for the data object(s) can be selected based on the context (e.g., based on a probability determined based on the context).

Figure 17:
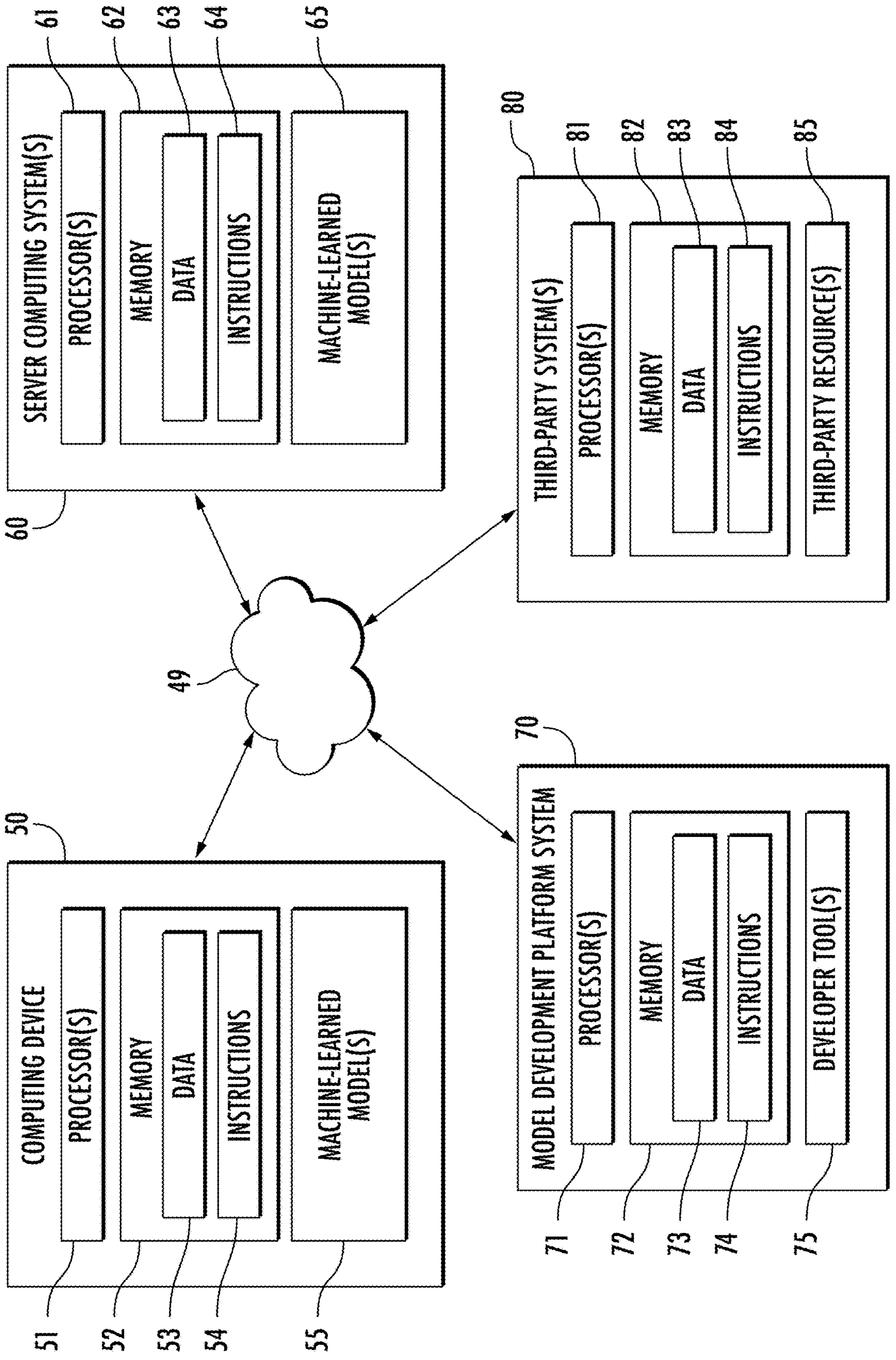
FIG. 17 depicts a block diagram of an example networked computing system according to example implementations of aspects of the present disclosure.

FIG. 17 is a block diagram of an example networked computing system that can perform aspects of example implementations of the present disclosure. The system can include a number of computing devices and systems that are communicatively coupled over a network 49. An example computing device 50 is described to provide an example of a computing device that can perform any aspect of the present disclosure (e.g., implementing model host 31, client(s) 32, or both). An example server computing system 60 is described as an example of a server computing system that can perform any aspect of the present disclosure (e.g., implementing model host 31, client(s) 32, or both). Computing device 50 and server computing system(s) 60 can cooperatively interact (e.g., over network 49) to perform any aspect of the present disclosure (e.g., implementing model host 31, client(s) 32, or both). Model development platform system 70 is an example system that can host or serve model development platform(s) 12 for development of machine-learned models. Third-party system(s) 80 are example system(s) with which any of computing device 50, server computing system(s) 60, or model development platform system(s) 70 can interact in the performance of various aspects of the present disclosure (e.g., engaging third-party tools, accessing third-party databases or other resources, etc.).

Network 49 can be any type of communications network, such as a local area network (e.g., intranet), wide area network (e.g., Internet), or some combination thereof and can include any number of wired or wireless links. In general, communication over network 49 can be carried via any type of wired or wireless connection, using a wide variety of communication protocols (e.g., TCP/IP, HTTP, SMTP, FTP), encodings or formats (e.g., HTML, XML), or protection schemes (e.g., VPN, secure HTTP, SSL). Network 49 can also be implemented via a system bus. For instance, one or more devices or systems of FIG. 17 can be co-located with, contained by, or otherwise integrated into one or more other devices or systems.

Computing device 50 can be any type of computing device, such as, for example, a personal computing device (e.g., laptop or desktop), a mobile computing device (e.g., smartphone or tablet), a gaming console or controller, a wearable computing device, an embedded computing device, a server computing device, a virtual machine operating on a host device, or any other type of computing device. Computing device 50 can be a client computing device. Computing device 50 can be an end-user computing device. Computing device 50 can be a computing device of a service provided that provides a service to an end user (who may use another computing device to interact with computing device 50).

Computing device 50 can include one or more processors 51 and a memory 52.

Processor(s) 51 can be any suitable processing device (e.g., a processor core, a microprocessor, an ASIC, an FPGA, a controller, a microcontroller, etc.) and can be one processor or a plurality of processors that are operatively connected. Memory 52 can include one or more non-transitory computer-readable storage media, such as HBM, RAM, ROM, EEPROM, EPROM, flash memory devices, magnetic disks, etc., and combinations thereof. Memory 52 can store data 53 and instructions 54 which can be executed by processor(s) 51 to cause computing device 50 to perform operations. The operations can implement any one or multiple features described herein. The operations can implement example methods and techniques described herein.

Computing device 50 can also include one or more input components that receive user input. For example, a user input component can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, camera, LIDAR, a physical keyboard or other buttons, or other means by which a user can provide user input.

Computing device 50 can store or include one or more machine-learned models 55. Machine-learned models 55 can include one or more machine-learned model(s) 1, such as a sequence processing model 4. Machine-learned models 55 can include one or multiple model instance(s) 31-1. Machine-learned model(s) 55 can be received from server computing system(s) 60, model development platform system 70, third party system(s) 80 (e.g., an application distribution platform), or developed locally on computing device 50. Machine-learned model(s) 55 can be loaded into memory 52 and used or otherwise implemented by processor(s) 51. Computing device 50 can implement multiple parallel instances of machine-learned model(s) 55.

Server computing system(s) 60 can include one or more processors 61 and a memory 62. Processor(s) 61 can be any suitable processing device (e.g., a processor core, a microprocessor, an ASIC, an FPGA, a controller, a microcontroller, etc.) and can be one processor or a plurality of processors that are operatively connected. Memory 62 can include one or more non-transitory computer-readable storage media, such as HBM, RAM, ROM, EEPROM, EPROM, flash memory devices, magnetic disks, etc., and combinations thereof. Memory 62 can store data 63 and instructions 64 which can be executed by processor(s) 61 to cause server computing system(s) 60 to perform operations. The operations can implement any one or multiple features described herein. The operations can implement example methods and techniques described herein.

In some implementations, server computing system 60 includes or is otherwise implemented by one or multiple server computing devices. In instances in which server computing system 60 includes multiple server computing devices, such server computing devices can operate according to sequential computing architectures, parallel computing architectures, or some combination thereof.

Server computing system 60 can store or otherwise include one or more machine-learned models 65. Machine-learned model(s) 65 can be the same as or different from machine-learned model(s) 55. Machine-learned models 65 can include one or more machine-learned model(s) 1, such as a sequence processing model 4. Machine-learned models 65 can include one or multiple model instance(s) 31-1. Machine-learned model(s) 65 can be received from computing device 50, model development platform system 70, third party system(s) 80, or developed locally on server computing system(s) 60. Machine-learned model(s) 65 can be loaded into memory 62 and used or otherwise implemented by processor(s) 61. Server computing system(s) 60 can implement multiple parallel instances of machine-learned model(s) 65.

In an example configuration, machine-learned models 65 can be included in or otherwise stored and implemented by server computing system 60 to establish a client-server relationship with computing device 50 for serving model inferences. For instance, server computing system(s) 60 can implement model host 31 on behalf of client(s) 32 on computing device 50. For instance, machine-learned models 65 can be implemented by server computing system 60 as a portion of a web service (e.g., remote machine-learned model hosting service, such as an online interface for performing machine-learned model operations over a network on server computing system(s) 60). For instance, server computing system(s) 60 can communicate with computing device 50 over a local intranet or internet connection. For instance, computing device 50 can be a workstation or endpoint in communication with server computing system(s) 60, with implementation of machine-learned models 65 being managed by server computing system(s) 60 to remotely perform inference (e.g., for runtime or training operations), with output(s) returned (e.g., cast, streamed, etc.) to computing device 50. Machine-learned models 65 can work cooperatively or interoperatively with machine-learned models 55 on computing device 50 to perform various tasks.

Model development platform system(s) 70 can include one or more processors 71 and a memory 72. Processor(s) 71 can be any suitable processing device (e.g., a processor core, a microprocessor, an ASIC, an FPGA, a controller, a microcontroller, etc.) and can be one processor or a plurality of processors that are operatively connected. Memory 72 can include one or more non-transitory computer-readable storage media, such as HBM, RAM, ROM, EEPROM, EPROM, flash memory devices, magnetic disks, etc., and combinations thereof. Memory 72 can store data 73 and instructions 74 which can be executed by processor(s) 71 to cause model development platform system(s) 70 to perform operations. The operations can implement any one or multiple features described herein. The operations can implement example methods and techniques described herein. Example operations include the functionality described herein with respect to model development platform 12. This and other functionality can be implemented by developer tool(s) 75.

Third-party system(s) 80 can include one or more processors 81 and a memory 82. Processor(s) 81 can be any suitable processing device (e.g., a processor core, a microprocessor, an ASIC, an FPGA, a controller, a microcontroller, etc.) and can be one processor or a plurality of processors that are operatively connected. Memory 82 can include one or more non-transitory computer-readable storage media, such as HBM, RAM, ROM, EEPROM, EPROM, flash memory devices, magnetic disks, etc., and combinations thereof. Memory 82 can store data 83 and instructions 84 which can be executed by processor(s) 81 to cause third-party system(s) 80 to perform operations. The operations can implement any one or multiple features described herein. The operations can implement example methods and techniques described herein. Example operations include the functionality described herein with respect to tools and other external resources called when training or performing inference with machine-learned model(s) 1, 4, 16, 20, 55, 65, etc. (e.g., third-party resource(s) 85).

FIG. 17 illustrates one example arrangement of computing systems that can be used to implement the present disclosure. Other computing system configurations can be used as well. For example, in some implementations, one or both of computing system 50 or server computing system(s) 60 can implement all or a portion of the operations of model development platform system 70. For example, computing system 50 or server computing system(s) 60 can implement developer tool(s) 75 (or extensions thereof) to develop, update/train, or refine machine-learned models 1, 4, 16, 20, 55, 65, etc. using one or more techniques described herein with respect to model alignment toolkit 17. In this manner, for instance, computing system 50 or server computing system(s) 60 can develop, update/train, or refine machine-learned models based on local datasets (e.g., for model personalization/customization, as permitted by user data preference selections).

Figure 18:
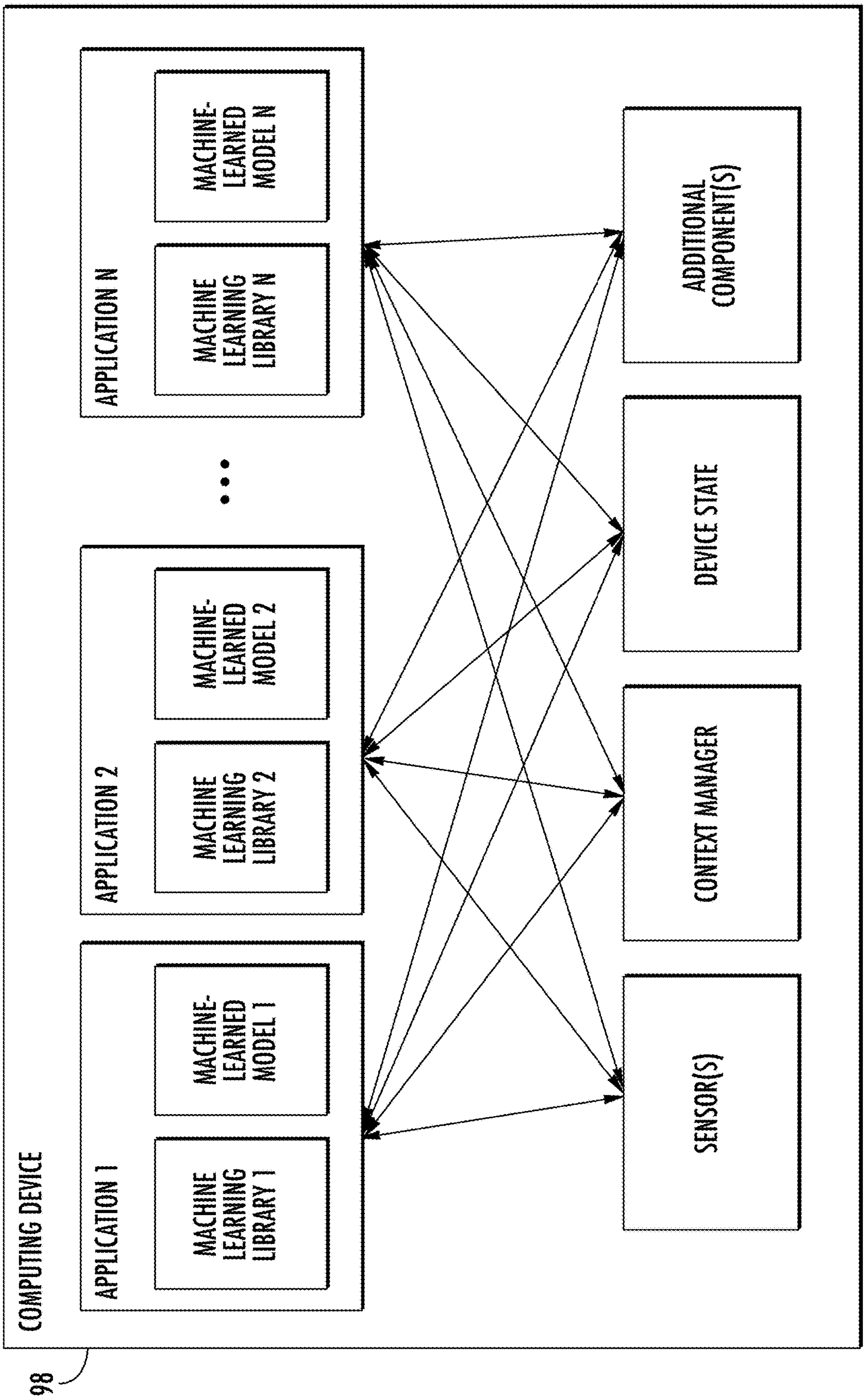
FIG. 18 depicts a block diagram of an example computing device according to example implementations of aspects of the present disclosure.

FIG. 18 is a block diagram of an example computing device 98 that performs according to example embodiments of the present disclosure. Computing device 98 can be a user computing device or a server computing device (e.g., computing device 50, server computing system(s) 60, etc.). Computing device 98 can implement model host 31. For instance, computing device 98 can include a number of applications (e.g., applications 1 through N). Each application can contain its own machine learning library and machine-learned model(s). For example, each application can include a machine-learned model. Example applications include a text messaging application, an email application, a dictation application, a virtual keyboard application, a browser application, etc. As illustrated in FIG. 18, each application can communicate with a number of other components of the computing device, such as, for example, one or more sensors, a context manager, a device state component, or additional components. In some implementations, each application can communicate with each device component using an API (e.g., a public API). In some implementations, the API used by each application is specific to that application.

Figure 19:
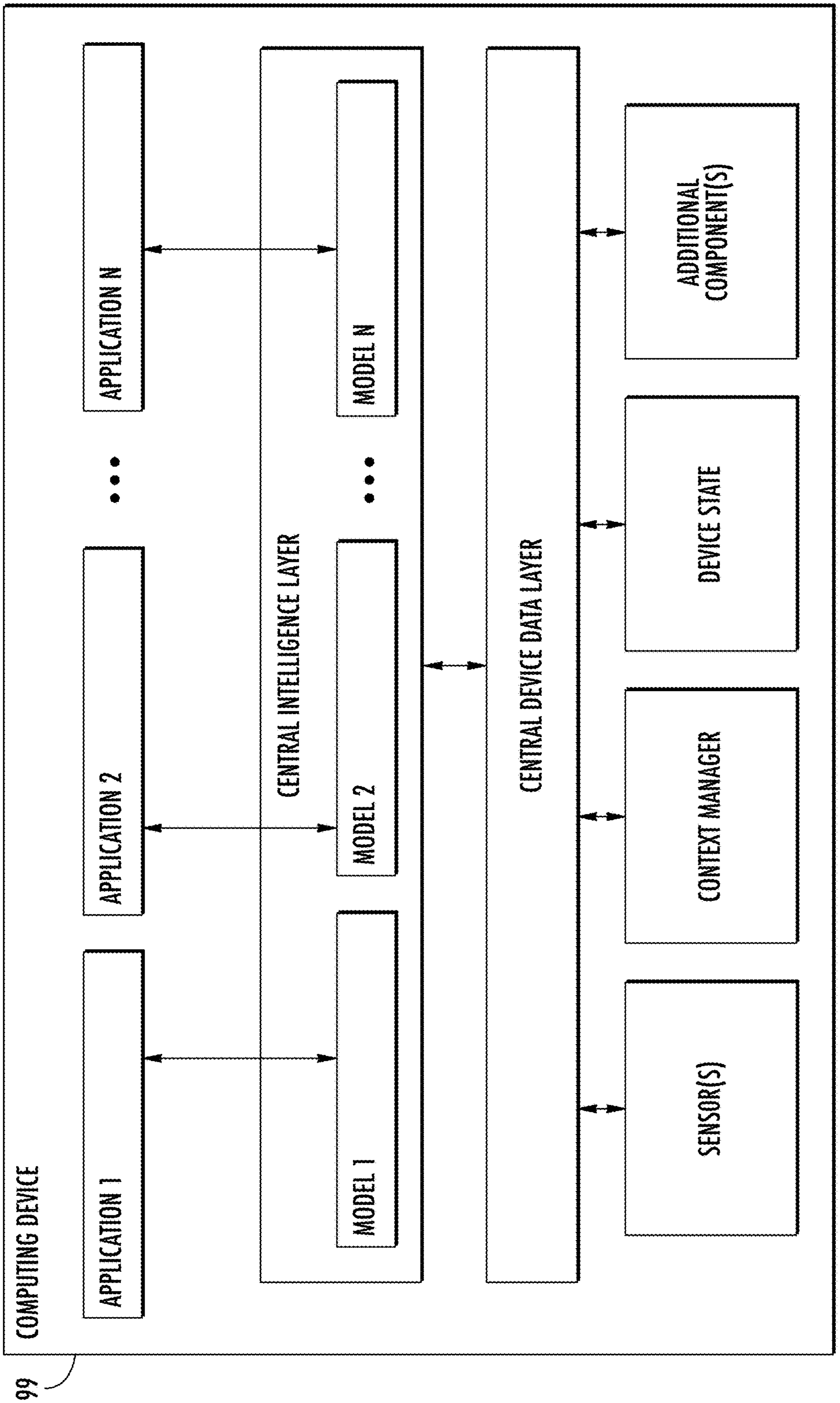
FIG. 19 depicts a block diagram of an example computing device according to example implementations of aspects of the present disclosure.

FIG. 19 is a block diagram of an example computing device 99 that performs according to example embodiments of the present disclosure. Computing device 99 can be the same as or different from computing device 98. Computing device 99 can be a user computing device or a server computing device (e.g., computing device 50, server computing system(s) 60, etc.). Computing device 98 can implement model host 31. For instance, computing device 99 can include a number of applications (e.g., applications 1 through N). Each application can be in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer can include a number of machine-learned models. For example, as illustrated in FIG. 19, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of computing device 99.

The central intelligence layer can communicate with a central device data layer. The central device data layer can be a centralized repository of data for computing device 99. As illustrated in FIG. 19, the central device data layer can communicate with a number of other components of the computing device, such as, for example, one or more sensors, a context manager, a device state component, or additional components. In some implementations, the central device data layer can communicate with each device component using an API (e.g., a private API).

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

Aspects of the disclosure have been described in terms of illustrative embodiments thereof. Any and all features in the following claims can be combined or rearranged in any way possible, including combinations of claims not explicitly enumerated in combination together, as the example claim dependencies listed herein should not be read as limiting the scope of possible combinations of features disclosed herein. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Clauses and other sequences of items joined by a particular conjunction such as "or," for example, can refer to "and/or," "at least one of", "any combination of" example elements listed therein, etc. Terms such as "based on" should be understood as "based at least in part on."

The term "can" should be understood as referring to a possibility of a feature in various implementations and not as prescribing an ability that is necessarily present in every implementation. For example, the phrase "X can perform Y" should be understood as indicating that, in various implementations, X has the potential to be configured to perform Y, and not as indicating that in every instance X must always be able to perform Y. It should be understood that, in various implementations, X might be unable to perform Y and remain within the scope of the present disclosure.

The term "may" should be understood as referring to a possibility of a feature in various implementations and not as prescribing an ability that is necessarily present in every implementation. For example, the phrase "X may perform Y" should be understood as indicating that, in various implementations, X has the potential to be configured to perform Y, and not as indicating that in every instance X must always be able to perform Y. It should be understood that, in various implementations, X might be unable to perform Y and remain within the scope of the present disclosure.

What is claimed is:

1. A computing system for video search result generation, the system comprising:

one or more processors; and one or more non-transitory computer-readable media that collectively store instructions that, when executed by the one or more processors, cause the computing system to perform operations, the operations comprising:

obtaining a search query entered into a search interface, wherein the search query is associated with a request for information on a subject;

determining a plurality of search results based on the search query, wherein the plurality of search results are determined to be responsive to the search query;

processing the search query and at least a subset of the plurality of search results with a generative agentic model to generate a video outline output, wherein the generative agentic model is configured to generate the video outline output descriptive of a set of tasks for video generation and comprising an interface task for interfacing with an external tool to perform at least a subset of the set of tasks;

determining a particular video search result based on the video outline output, wherein the particular video search result is associated with the subject and obtained from a web source;

generating a synthetic video segment with a video generation model based on processing at least a portion of the video outline output generated with the generative agentic model;

generating a response video based on the video outline output, the particular video search result, and the synthetic video segment, wherein the response video comprises at least a portion of the particular video search result and at least a portion of the synthetic video segment; and providing the response video for display within the search interface.

2. The system of claim 1, wherein generating the response video based on the video outline output, the particular video search result, and the synthetic video segment comprises:

stitching together at least one or more portions of the particular video search result with at least one or more portions of the synthetic video segment based on the video outline output to generate a stitched video.

3. The system of claim 2, wherein the at least one or more portions of the particular video search result are stitched together with the at least one or more portions of the synthetic video segment by the generative agentic model.

4. The system of claim 3, wherein the generative agentic model interfaces with a search engine to determine and obtain the particular video search result, wherein the generative agentic model interfaces with the video generation model to generate and obtain the synthetic video segment, and wherein the generative agentic model processes the video outline output, the particular video search result, and the synthetic video segment to generate the response video.

5. The system of claim 2, wherein generating the response video based on the video outline output, the particular video search result, and the synthetic video segment further comprises:

processing the stitched video with the generative agentic model to generate a narration script for the stitched video;

processing the narration script with an audio generation model to generate a model-generated audio output; and generating the response video based on combining visuals of the stitched video with the model-generated audio output.

6. The system of claim 1, wherein generating the response video based on the video outline output, the particular video search result, and the synthetic video segment comprises:

parsing the particular video search result into a plurality of pre-existing video segments; and concatenating at least a subset of the plurality of pre-existing video segments with the synthetic video segment.

7. The system of claim 1, wherein the video outline output comprises an outline indicating a plurality of content items from the plurality of search results to utilize in video generation, and wherein the outline further comprises a synthetic video generation prompt to transmit to the video generation model, and wherein the outline further comprises a pre-existing video obtainment request.

8. The system of claim 7, wherein the plurality of content items comprises text content items and image content items.

9. The system of claim 8, wherein generating the response video based on the video outline output, the particular video search result, and the synthetic video segment comprises:

generating an audio file based on the text content items;

generating a sequence of visuals based on the image content items, the particular video search result, and the synthetic video segment; and generating the response video based on the audio file and the sequence of visuals.

10. The system of claim 1, wherein the video generation model comprises a video diffusion model.

11. A computer-implemented method for hybrid video generation, the method comprising:

obtaining, by a computing system comprising one or more processors, a search query entered into a user interface, wherein the search query is associated with a request for information on a subject;

determining, by the computing system, a plurality of search results based on the search query, wherein the plurality of search results are determined to be responsive to the search query;

processing, by the computing system, the search query and at least a subset of the plurality of search results with a generative agentic model to generate a video outline output, wherein the generative agentic model is configured to generate the video outline output descriptive of a set of tasks for video generation and comprising an interface task for interfacing with an external tool to perform at least a subset of the set of tasks;

determining, by the computing system, a plurality of particular video search results based on the video outline output, wherein the plurality of particular video search results are associated with the subject and obtained from a plurality of web sources;

generating, by the computing system, a plurality of synthetic video segments with a video generation model based on processing at least a portion of the video outline output generated with the generative agentic model;

generating, by the computing system, a response video based on the video outline output, the plurality of particular video search results, and the plurality of synthetic video segments, wherein the response video comprises a plurality of pre-existing video segments from the plurality of particular video search results and a plurality of model-generated video segments from the plurality of synthetic video segments; and providing, by the computing system, the response video for display within the user interface.

12. The method of claim 11, further comprising:

generating a plurality of source tags based on the plurality of particular video search results utilized to generate the response video, wherein the plurality of source tags are associated with the plurality of sources of the plurality of particular video search results;

processing the response video to generate a plurality of source tag anchors descriptive of times within the response video in which respective video segments of the plurality of particular video search results are displayed; and associating the plurality of source tags with the plurality of source tag anchors.

13. The method of claim 12, wherein providing, by the computing system, the response video for display within the user interface comprises:

during video playback: providing a respective source tag of the plurality of source tags for display when a respective source tag anchor of the plurality of source tag anchors is reached.

14. The method of claim 12, wherein the plurality of source tags comprise a plurality of selectable user interface elements that are selectable to navigate to a respective source of the plurality of sources of the plurality of particular video search results.

15. The method of claim 11, wherein the video outline output comprises content item snippets from the plurality of search results, model-generated text segments, content item identifiers associated with videos from the plurality of search results, a video segment generation prompt, and a plurality of tool calls for interfacing with a plurality of external tools.

16. The method of claim 11, wherein the response video comprises the plurality of model-generated video segments as transitions for providing additional details associated with content provided by the plurality of pre-existing video segments.

17. One or more non-transitory computer-readable media that collectively store instructions that, when executed by one or more computing devices, cause the one or more computing devices to perform operations, the operations comprising:

obtaining a search query, wherein the search query is associated with a request for information on a subject;

determining a plurality of search results based on the search query, wherein the plurality of search results are determined to be responsive to the search query, wherein the plurality of search results comprise a plurality of video search results;

processing the search query and at least a subset of the plurality of search results with a generative agentic model to generate a video segment generation prompt and a model call, wherein the generative agentic model is configured to generate the video outline output descriptive of a set of tasks for video generation and comprising an interface task for interfacing with an external tool to perform at least a subset of the set of tasks;

determining, with the generative agentic model, a set of video search results of the plurality of video search results to utilize for response video generation, wherein the set of video search results are associated with the subject and obtained from a web source;

generating, based on the model call, a synthetic video segment with a video generation model based on processing the video segment generation prompt generated with the generative agentic model;

generating a response video based on the set of video search results and the synthetic video segment, wherein the response video comprises at least a portion of the set of video search results and at least a portion of the synthetic video segment; and providing the response video as output.

18. The one or more non-transitory computer-readable media of claim 17, wherein the operations further comprise:

obtaining web data;

processing the web data to determine a trending topic; and generating the search query based on the trending topic.

19. The one or more non-transitory computer-readable media of claim 18, wherein the operations further comprise:

storing the search query and the response video in an index database.

20. The one or more non-transitory computer-readable media of claim 19, wherein the operations further comprise:

obtaining a user query with a search interface;

determining the user query is associated with the subject of the search query; and in response to determining the user query is associated with the subject of the search query, providing the response video for display with the search interface.

* * * * *